(12) United States Patent
Borisoff

(10) Patent No.: US 12,383,446 B2
(45) Date of Patent: Aug. 12, 2025

(54) DEPLOYABLE AUXILIARY SUPPORT FOR A WHEELED APPARATUS SUPPORTING A PERSON

(71) Applicant: Jaimie F. Borisoff, British Columbia (CA)

(72) Inventor: Jaimie F. Borisoff, British Columbia (CA)

( * ) Notice: Subject to any disclaimer, the term of this patent is extended or adjusted under 35 U.S.C. 154(b) by 0 days.

(21) Appl. No.: 18/547,928

(22) PCT Filed: Feb. 28, 2022

(86) PCT No.: PCT/CA2022/050282
§ 371 (c)(1),
(2) Date: Aug. 25, 2023

(87) PCT Pub. No.: WO2022/178646
PCT Pub. Date: Sep. 1, 2022

(65) Prior Publication Data
US 2025/0017793 A1    Jan. 16, 2025

Related U.S. Application Data

(60) Provisional application No. 63/154,370, filed on Feb. 26, 2021.

(51) Int. Cl.
*A61G 5/00* (2006.01)
*A61G 5/08* (2006.01)
(Continued)

(52) U.S. Cl.
CPC .......... *A61G 5/0891* (2016.11); *A61G 5/1054* (2016.11); *A61G 5/128* (2016.11)

(58) Field of Classification Search
CPC . A61G 5/128; A61G 5/08; A61G 3/06; A61G 5/12; A61G 1/0237; A61G 1/0268;
(Continued)

(56) References Cited

U.S. PATENT DOCUMENTS

| | | | | | |
|---|---|---|---|---|---|
| 4,826,196 | A | * | 5/1989 | Kirkpatrick | A61G 5/085 297/50 |
| 4,887,826 | A | * | 12/1989 | Kantner | A61G 5/085 297/53 |

(Continued)

FOREIGN PATENT DOCUMENTS

| | | | | |
|---|---|---|---|---|
| DE | 202008013634 U1 | * | 1/2009 | A61G 5/02 |
| GB | 2437502 A | * | 10/2007 | A61G 5/107 |
| WO | WO-2011153585 A1 | * | 12/2011 | A61G 5/02 |

OTHER PUBLICATIONS

Translation of DE 202008013634 U1 accessed on Dec. 11, 2024 at www.espacenet.com (Year: 2009).*

*Primary Examiner* — James A Shriver, II
*Assistant Examiner* — Hilary L Johns
(74) *Attorney, Agent, or Firm* — Ryan W. Dupuis; Michael R. Williams; Ade & Company Inc.

(57) ABSTRACT

An auxiliary support assembly for a wheeled apparatus, for example a wheelchair, includes a mounting arrangement for being fixed on the apparatus, an auxiliary support such as a wheel or ski, and a linkage arrangement supporting the auxiliary support to be movable relative to the apparatus between a deployed position supporting front wheels of the apparatus spaced above the ground and a stored position out of use with the front wheels on the ground. In one embodiment, the auxiliary support swings under the mounting arrangement between stored and working positions. In another embodiment, the auxiliary support is carried on a swing arm to be locked in a deployed position by a four bar linkage. In either embodiment, a first adjustment allows height and angular orientation of a steering axis of the deployed auxiliary support to be adjusted, while a second adjustment primarily adjusts the angular orientation of the steering axis.

21 Claims, 27 Drawing Sheets

(51) Int. Cl.
*A61G 5/10* (2006.01)
*A61G 5/12* (2006.01)

(58) Field of Classification Search
CPC ........ A61G 5/06; A61G 5/0883; A61G 5/127; A61G 12/005; A61G 5/00; A61G 5/1075; A61G 5/108; A61G 5/10; A61G 5/1083; A61G 5/1089; A61G 5/0891; A61G 5/1054; A61H 3/04; B62N 3/02; B62B 7/04; B62B 7/06
USPC .......................................................... 280/65
See application file for complete search history.

(56) References Cited

U.S. PATENT DOCUMENTS

| | | | | |
|---|---|---|---|---|
| 5,110,173 A * | 5/1992 | Megna | ..................... | A61G 3/06 296/65.13 |
| 5,507,513 A * | 4/1996 | Peters | ...................... | A61G 5/00 280/250.1 |
| 5,593,173 A * | 1/1997 | Williamson | ........... | A61G 5/085 280/250.1 |
| 5,613,825 A * | 3/1997 | Dorn | ........................ | A61G 3/06 414/544 |
| 6,464,243 B2 * | 10/2002 | Roche | ..................... | A61G 5/08 280/250.1 |
| 7,540,507 B1 * | 6/2009 | Kennedy | .............. | B60N 2/2821 280/30 |
| 7,815,209 B2 * | 10/2010 | Porcheron | ................ | A61G 5/14 280/250.1 |
| 7,971,893 B1 * | 7/2011 | Dunn | ................... | A61G 5/1089 280/304.5 |
| 8,585,071 B2 * | 11/2013 | Golden, Jr. | .......... | A61G 5/1054 280/304.1 |
| 10,035,437 B1 * | 7/2018 | Ballard | ................ | B60N 2/2842 |
| 11,883,334 B2 * | 1/2024 | Derenne | .............. | A61G 1/0237 |
| 2006/0263183 A1 * | 11/2006 | Goodrich | ................ | A61G 3/06 414/471 |
| 2010/0090437 A1 * | 4/2010 | Knopf | .................... | A61G 5/128 280/250.1 |
| 2011/0084578 A1 * | 4/2011 | Newkirk | ............... | A61G 7/1038 211/96 |
| 2011/0277241 A1 * | 11/2011 | Schejbal | ................ | A61G 7/018 5/510 |
| 2012/0169026 A1 * | 7/2012 | Golden, Jr. | ............. | A61G 5/02 280/250.1 |
| 2016/0374480 A1 * | 12/2016 | Wilson | ..................... | A47C 7/50 297/137 |
| 2018/0214337 A1 * | 8/2018 | Hubert | ...................... | A61H 3/04 |
| 2020/0022853 A1 * | 1/2020 | Burela | ................... | A61G 5/045 |
| 2020/0121083 A1 * | 4/2020 | Rothweiler | ............. | A47C 9/10 |
| 2020/0155384 A1 * | 5/2020 | Derenne | ................ | A61G 1/0268 |
| 2021/0401643 A1 * | 12/2021 | Moore | ..................... | A61G 5/12 |

* cited by examiner

DEPLOYABLE AUXILIARY SUPPORT FOR A WHEELED APPARATUS SUPPORTING A PERSON

FIELD OF THE INVENTION

The present invention relates to an auxiliary support, for example a wheel or a ski, adapted to be mounted onto a wheeled apparatus for supporting a person therein or thereon, for example a wheelchair, stroller, or wheeled walker (i.e. rollator), and more particularly the present invention relates to an auxiliary support, for example a wheel or a ski, for the wheeled apparatus that can be displaced between a stored position in which the wheeled apparatus is supported entirely on a set of primary wheels and a deployed position in which the wheeled apparatus is partly supported on the auxiliary support to increase a wheelbase of the wheeled device.

BACKGROUND

In a variety of wheeled apparatuses, including wheelchairs, strollers, and wheeled walkers or rollators, the apparatus may be ineffective at traversing uneven terrain due to the small diameter of some of the wheels and the short wheelbase. For example, a common wheelchair arrangement includes (i) a chair frame to support a seated occupant thereon, (ii) large diameter rear wheels that can be grasped by a user to propel the wheelchair, and (iii) small diameter front wheels in the form of caster wheels that swivel to assist steerability. Due to the small diameter of the front wheels, and the short wheelbase of the wheelchair frame, common wheelchair arrangements are known to have difficulty with stability and steering on rough, uneven, or soft terrain.

U.S. Pat. Nos. 8,152,192 and 7,735,847, both by Dougherty, disclose various examples of an all terrain adapter for a wheelchair which removably clamps onto the wheelchair and which supports an auxiliary wheel thereon that has a larger diameter than the existing front wheels of the wheelchair and that increases the wheelbase of the wheelchair to improve stability and improve the ability to roll over uneven terrain. The adapter must typically be removed when not in use and stored on the person or wheelchair, which can be cumbersome and time inefficient to deploy.

SUMMARY OF THE INVENTION

According to one aspect of the invention there is provided an auxiliary support assembly for a wheeled apparatus arranged for rolling movement on a supporting surface, the apparatus including a support frame for supporting a person, two rear wheels supported on the support frame in proximity to a rear end of the support frame, and two front wheels supported on the support frame in proximity to a front end of the support frame, the auxiliary support assembly comprising:

a mounting arrangement arranged to be supported on the support frame;
  an auxiliary support arranged for movement along said supporting surface; and
  a linkage arrangement connected to the mounting arrangement so as to be movable relative to the support frame, the linkage arrangement supporting the auxiliary support to be movable with the linkage arrangement relative to the support frame between a deployed position and a stored position;

wherein in the deployed position, the auxiliary wheel is arranged to be supported forwardly of the two front wheels at a lower elevation than the two front wheels such that the apparatus is carried on the supporting surface by the rear wheels and the auxiliary wheel and such that the front wheels are spaced above the supporting surface; and wherein in the stored position, the auxiliary support is retracted rearwardly relative to the deployed position and is raised in elevation relative to the front wheels and the rear wheels of the apparatus such that the apparatus is carried on the supporting surface by the front wheels and the rear wheels and such that the auxiliary support is spaced above the supporting surface.

The linkage arrangement may be arranged such that a protruding distance that the auxiliary support assembly protrudes forwardly from the support frame is reduced by at least 30 percent, and more preferably at least 50 percent, in the stored position relative to the deployed position. Furthermore, the linkage arrangement may be arranged to support the auxiliary support such that the auxiliary support at least partially, or fully, traverses an upright plane at a front end of the support frame as the auxiliary support is displaced into the stored position.

In the illustrated embodiments, the linkage arrangement includes a swing arm arranged to be pivotally coupled relative to the support frame by said pivotal connection of the mounting arrangement, the auxiliary support being carried on the swing arm so as to be movable between the deployed position and the stored position by pivoting of the swing arm relative to the support frame. The swing arm may be pivotal through a range of at least 30 degrees, and more preferably at least 50 degrees, between the deployed position and the stored position.

The mounting arrangement may define a pivotal connection at a fixed location on the support frame about which the auxiliary support pivots with the linkage arrangement relative to the support frame.

The auxiliary support may be supported to be fixed in a forward movement orientation relative to the linkage arrangement.

The auxiliary support may be supported on the linkage arrangement so as to be pivotal about an upright steering axis, in which an axis of rotation of the auxiliary support is located in a trailing relationship rearwardly of the upright steering axis in the deployed position.

The auxiliary support may be supported on the linkage arrangement so as to be pivotal about a steering axis that extends upward at a rearward slope, in which the auxiliary support is further biased about the steering axis towards a neutral orientation supported for forward movement.

The frame of the wheeled device apparatus includes a footrest frame portion arranged to support feet of the person thereon, the mounting arrangement of the assembly including a mounting frame defining a pivotal connection of the linkage arrangement relative the mounting arrangement, the mounting frame being arranged to be mounted at a fixed location on the footrest frame portion. When the footrest frame portion includes a footrest platform that is adjustable in height relative to a remaining portion of the support frame, the assembly may further comprise a riser platform arranged to be supported on the footrest frame portion spaced above the footrest platform, in which the riser platform includes a central slot formed therein receiving the linkage arrangement therethrough as the auxiliary support is displaced between the deployed position and the stored position.

When the support frame of the wheeled apparatus includes a footrest frame portion arranged to support feet of the person thereon and the footrest frame portion is adjustable in height relative to a remaining portion of the support frame, the mounting arrangement may include a mounting frame defining a pivotal connection of the linkage arrangement relative the mounting arrangement, in which the mounting frame is arranged to be mounted in fixed relation onto said remaining portion of the support frame.

The linkage arrangement may include a resilient member biasing the linkage arrangement towards the deployed position when the auxiliary support is in proximity to the deployed position.

The linkage arrangement may include a swing arm arranged to be pivotally coupled relative to the support frame by a pivotal connection on the mounting arrangement, in which the auxiliary support is carried on the swing arm so as to be movable between the deployed position and the stored position by pivoting of the swing arm relative to the chair frame.

The swing arm may be pivotal through a range of at least 30 degrees between the deployed position and the stored position, and more preferably a range of at least 50 degrees between the deployed position and the stored position. In yet further embodiments, for example when the swing arm passes under the mounting frame between the deployed and stored positions, the swing arm may be pivotal through of range of at least 160, or near 180 degrees.

According to one illustrated embodiment, the mounting arrangement of the assembly including a mounting frame arranged to be mounted at a fixed location on the footrest frame portion and the linkage arrangement includes (i) a plurality of links coupled between the swing arm and the mounting frame and (ii) a handle member extending from a first intermediate link among the plurality of links, the handle member being pivotal with the first intermediate link relative to the mounting frame and being movable forwardly relative to the mounting frame as the auxiliary wheel is displaced from the stored position to the deployed position. More particularly, the linkage arrangement may be a four-bar linkage.

The mounting arrangement of the assembly may include a mounting frame arranged to be mounted at a fixed location on the footrest frame portion. The four-bar linkage of the linkage arrangement may further comprises: (i) a swing arm pivotally coupled onto the mounting frame in which the auxiliary support is carried on the swing arm so as to be movable between the deployed position and the stored position by pivoting of the swing arm relative to the mounting frame; (ii) a first intermediate link pivotally coupled on the mounting frame at a first axis at a location spaced from a pivotal connection of the swing arm; and (iii) a second intermediate link pivotally coupled on the first intermediate link at a second axis and pivotally coupled on the swing arm at a third axis; in which (iv) the third axis traverses through a plane that locates the first axis and the second axis therein as the auxiliary support is displaced from the stored position to the deployed position.

According to another embodiment, the linkage arrangement includes a plurality of links arranged to be coupled between the swing arm and the support frame in which the linkage arrangement is coupled to the support frame independently of said pivotal connection that connects the swing arm to the support frame.

According to a further embodiment, the swing arm may be coupled by said pivotal connection for pivotal movement about a swing arm axis and the linkage arrangement supports the auxiliary support to pass under the swing arm axis between the deployed position forwardly of the swing arm axis and the stored position rearwardly of the swing arm axis. In this instance, the linkage arrangement may be further arranged to engage a stop on the support frame in the deployed position so as to prevent displacement of the auxiliary support away from the stored position beyond the deployed position.

The swing arm may be adjustable in length between said pivotal connection of the mounting arrangement and the auxiliary support on the swing arm.

The auxiliary support may be an auxiliary wheel, a pair of laterally spaced apart auxiliary wheels, or a ski.

The linkage arrangement may include: (i) a swing arm arranged to be pivotally coupled relative to the support frame by a pivotal connection on the mounting arrangement in which the auxiliary support is carried on the swing arm so as to be movable between the deployed position and the stored position by pivoting of the swing arm relative to the chair frame; and (ii) a locking linkage arranged to retain the swing arm in the deployed position in an engaged position of the locking linkage, the locking linkage being automatically engaged into the engaged position in response to the swing arm being displaced into the deployed position. Preferably the locking linkage is biased into the engaged position by a spring. Preferably the swing arm is biased into the deployed position from an intermediate position between the deployed position and the stored position. The swing arm may be biased into the deployed position by gravity any/or by a spring. A common spring member may be used to apply a biasing force that simultaneously biases the swing arm into the deployed position and biases the locking linkage into the engaged position.

According to another embodiment, the mounting arrangement may comprises a mounting frame arranged to be fixed onto the support frame and the swing arm may be positively locked in one or both of the deployed position or the stored position by a latching mechanism, for example a pin supported on one of the swing arm or the mounting frame that is selectively received within a cooperating aperture on the other one of the swing arm or the mounting frame.

According to further embodiments, any of the above embodiments noted herein may be further provided with first and second adjustable connections which provide for height and angular adjustment of the steering axis of the auxiliary wheel in the deployed position. In this instance, the assembly may further comprise: (i) a swivel supporting the auxiliary support on the linkage arrangement for pivotal movement about an upright steering axis; (ii) the linkage arrangement including an inner arm portion coupled to the mounting arrangement and an outer arm portion coupling the swivel to the inner arm portion; (iii) a first adjustable connection between the outer arm portion and a first one of the inner arm portion and the swivel; (iv) a second adjustable connection between the outer arm portion and a second one of the inner arm portion and the swivel; (v) the first adjustable connection being adjustable between a plurality of different mounting configurations corresponding to different angular orientations of the upright steering axis relative to the mounting arrangement in the deployed position of the linkage arrangement; (vi) the second adjustable connection being adjustable between a plurality of different mounting configurations corresponding to different angular orientations of the upright steering axis relative to the mounting arrangement in the deployed position of the linkage arrangement; and (vii) a first one of the first adjustable connection and the second adjustable connection comprising a primary adjustable connection and a second one of the first adjustable connection and the second adjustable connection comprising a secondary adjustable connection; (viii) wherein each different mounting configuration of the primary adjustable connection further corresponds to a different elevation of the auxiliary support relative to the mounting arrangement in the deployed position of the linkage arrangement whereby the elevation of the auxiliary support relative to the mounting arrangement in the deployed position of the linkage arrangement is adjusted primarily through the primary adjustable connection.

In the deployed position of the linkage arrangement, the elevation of the auxiliary support preferably varies with adjustment of the angular orientation of the upright steering axis relative to the mounting arrangement between the different mounting configurations of the primary adjustable connection by a greater amount than the elevation of the auxiliary support varies with adjustment of the angular orientation of the upright steering axis relative to the mounting arrangement between the different mounting configurations of the secondary adjustable connection.

The elevation of the auxiliary support in the deployed position may remain substantially unchanged throughout the different mounting configurations of the secondary adjustable connection.

The first adjustable connection may be the primary adjustable connection.

BRIEF DESCRIPTION OF THE DRAWINGS

Some embodiments of the invention will now be described in conjunction with the accompanying drawings in which.

In the drawings like characters of reference indicate corresponding parts in the different figures.

DETAILED DESCRIPTION

Figure 1:
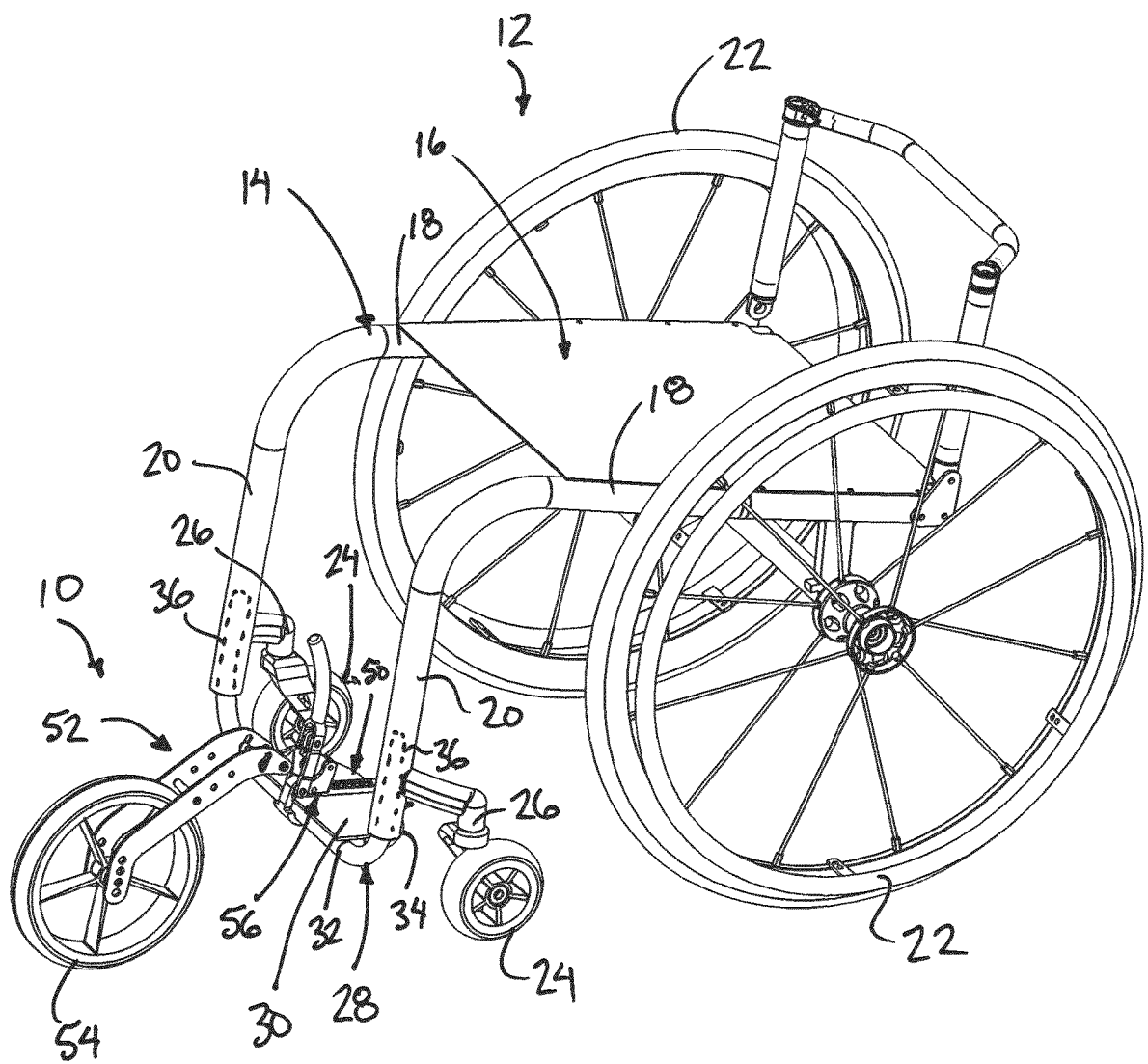
FIG. 1 is a perspective view of the auxiliary wheel assembly supported on a wheeled apparatus according to a first embodiment of the present invention.
Figure 2:
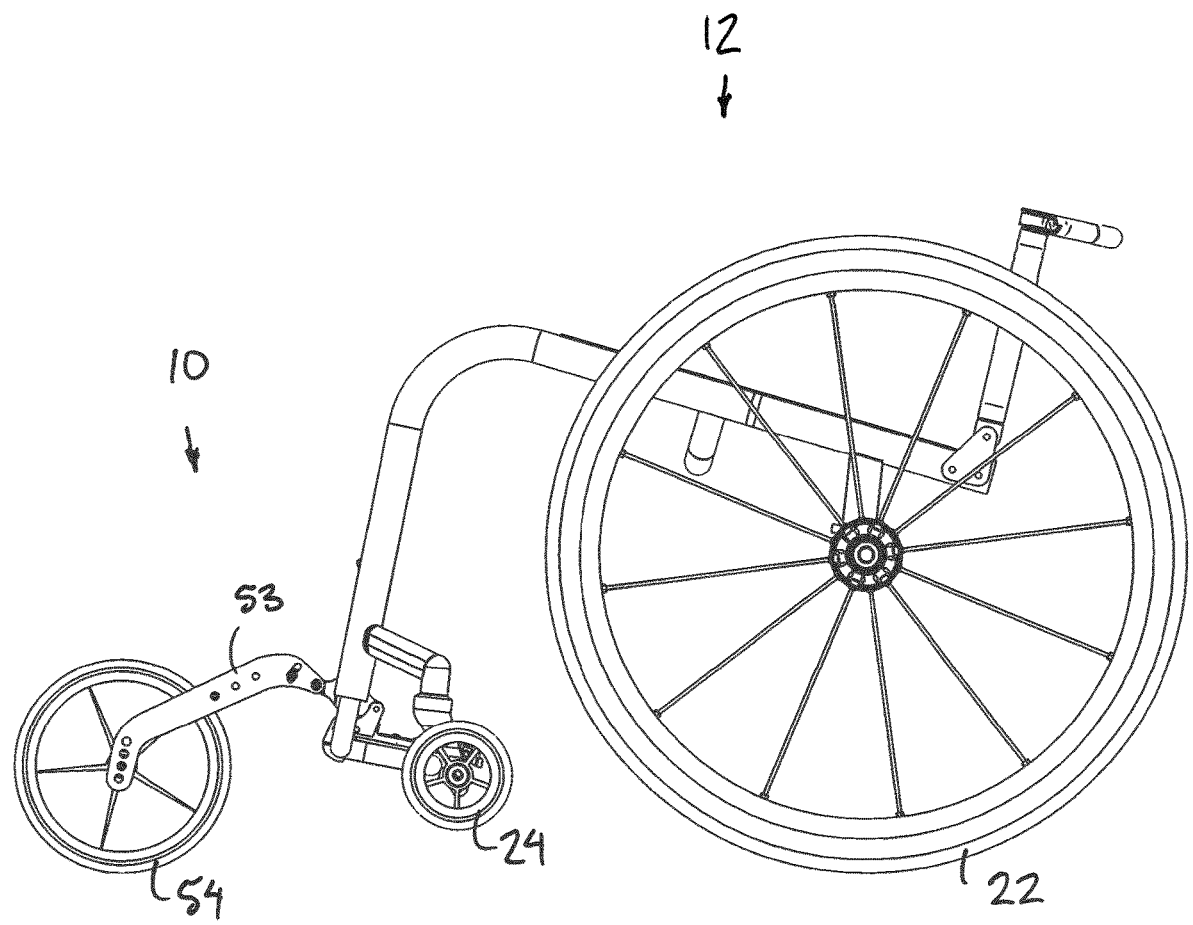
FIG. 2 is a side view of the auxiliary wheel assembly according to FIG. 1 on the wheeled apparatus in the deployed position.
Figure 3:
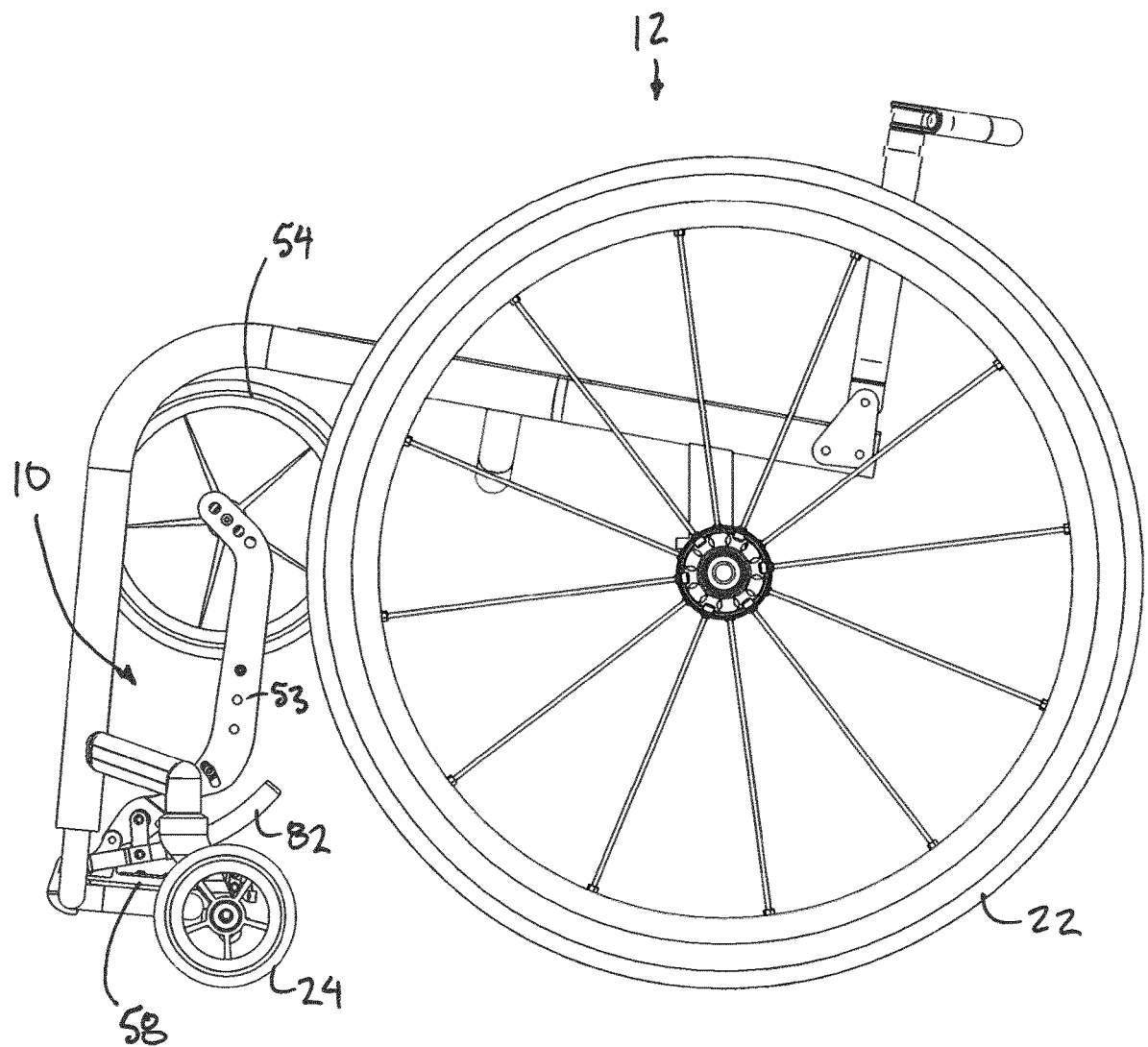
FIG. 3 is a side view of the auxiliary wheel assembly according to FIG. 1 on the wheeled apparatus in a stored position.
Figure 4:
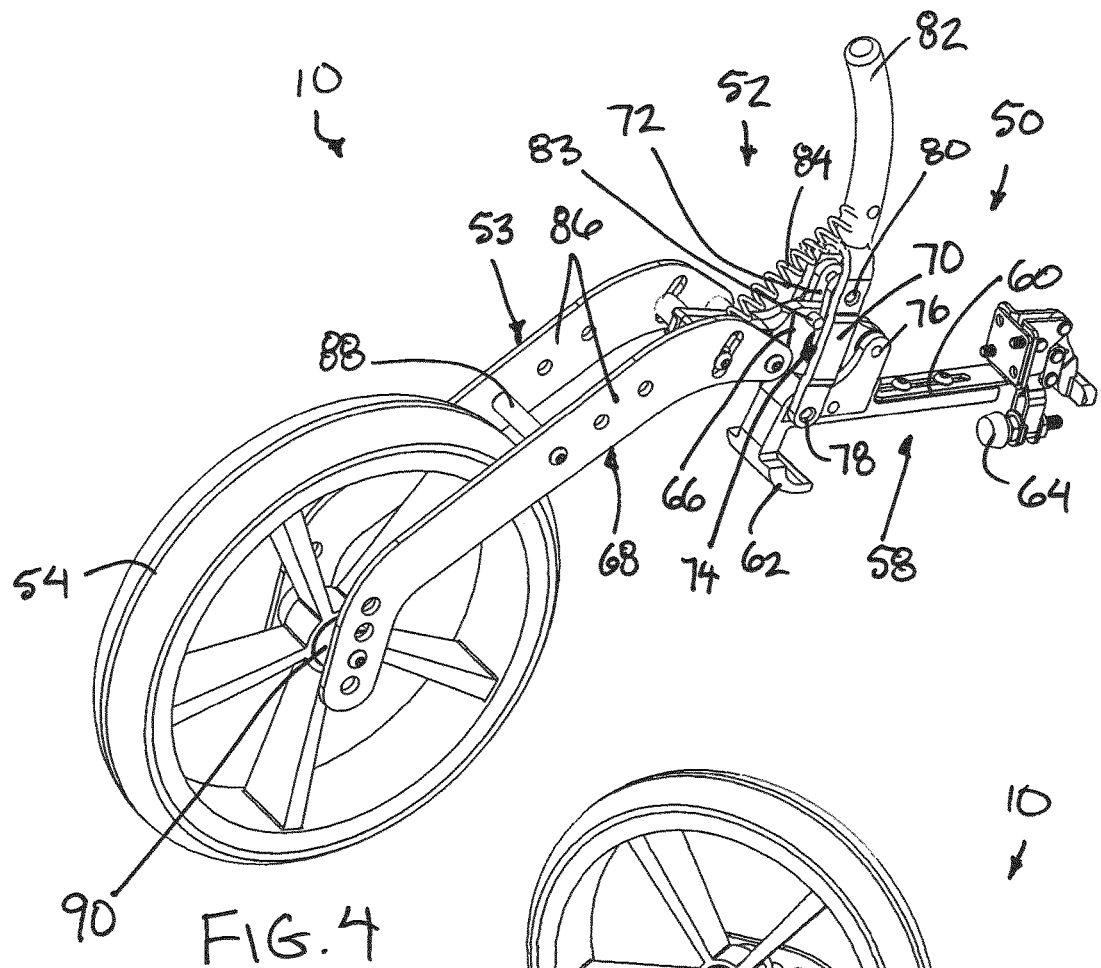
FIG. 4 is a perspective view of the auxiliary wheel assembly according to FIG. 1 in the deployed position.
Figure 5:
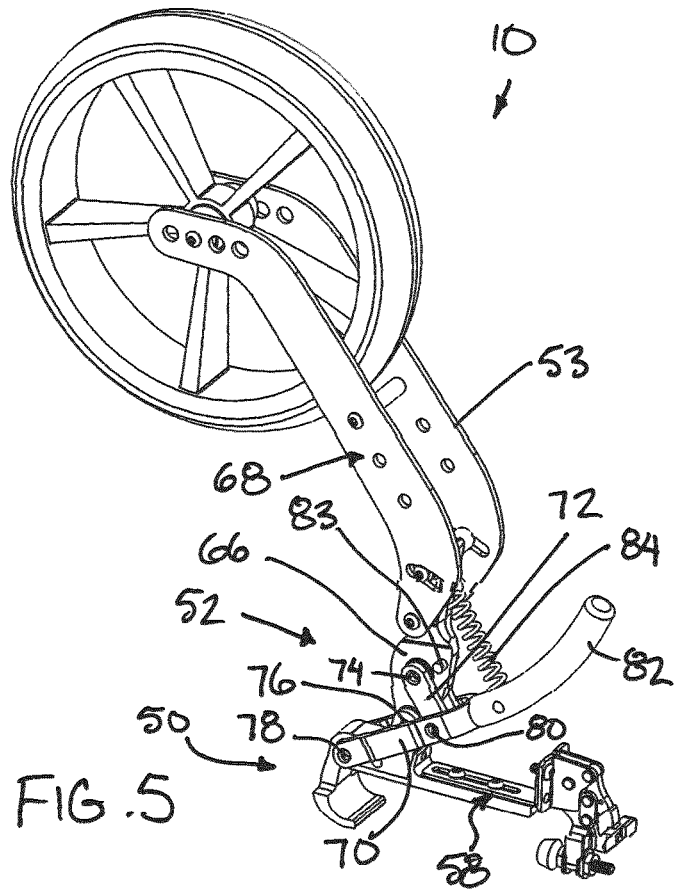
FIG. 5 is a perspective view of the auxiliary wheel assembly according to FIG. 1 in the stored position.

Referring to the accompanying figures there is illustrated an auxiliary wheel assembly 10 adapted to be mounted onto a wheeled apparatus 12, for example a wheelchair or stroller or rollator for supporting a person, either seated, standing, or otherwise.

In some of the illustrated embodiments, the wheeled apparatus 12 comprises a main chair frame 14 supporting a seat 16 thereon upon which the occupant may be seated. Typically the chair frame 14 includes two side frame portions 18 at laterally opposing sides to extend longitudinally between front and rear ends of the frame. A seating surface which defines the seat 16 is typically suspended to extend between the two side frame portions 18. The chair frame may further include a backrest portion extending upward from the rear ends of the side frame portions to support a backrest of the seat thereon. The chair frame typically also includes two front tubes 20 which are upright in orientation at laterally opposing sides of the chair frame at the front end thereof.

The chair frame is supported for rolling movement along the ground on a set of primary wheels of the apparatus 12 when the auxiliary wheel assembly 10 is stored. The primary wheels include two rear wheels 22 rotatably supported at laterally opposing sides of the chair frame in proximity to the rear end thereof, and two front wheels 24 rotatably supported at laterally opposing sides of the chair frame in proximity to the front end thereof. The rear wheels are typically much larger in diameter than the front wheels and are supported on the side frame portions 18 of the chair frame. The front wheels typically comprise castor wheels supported by respective swivels 26 for pivotal movement relative to the chair frame about respective vertical steering axes.

The chair frame 14 typically also further includes a foot rest frame portion 28 defining one or more foot rest platforms 30 thereon to support the feet of the user thereon. The foot rest platforms may be adjustable in height relative to the chair frame.

With reference to FIG. 1, the foot rest frame portion 28 in this instance may comprise a front bar 32 and a rear bar 34 rearward of the front bar and joined together at laterally opposing ends respectively to support the foot rest platform 30 thereon. Two posts 36 extend upwardly from opposing ends of the front and rear bars in a U-shaped relationship therewith for mounting in slidable relation into respective ones of the two front tubes 20 of the chair frame respectively. The two posts 36 are held fixed in place at a height appropriate for a particular user by a clamp, bolt, or similar mechanism.

Figure 10:
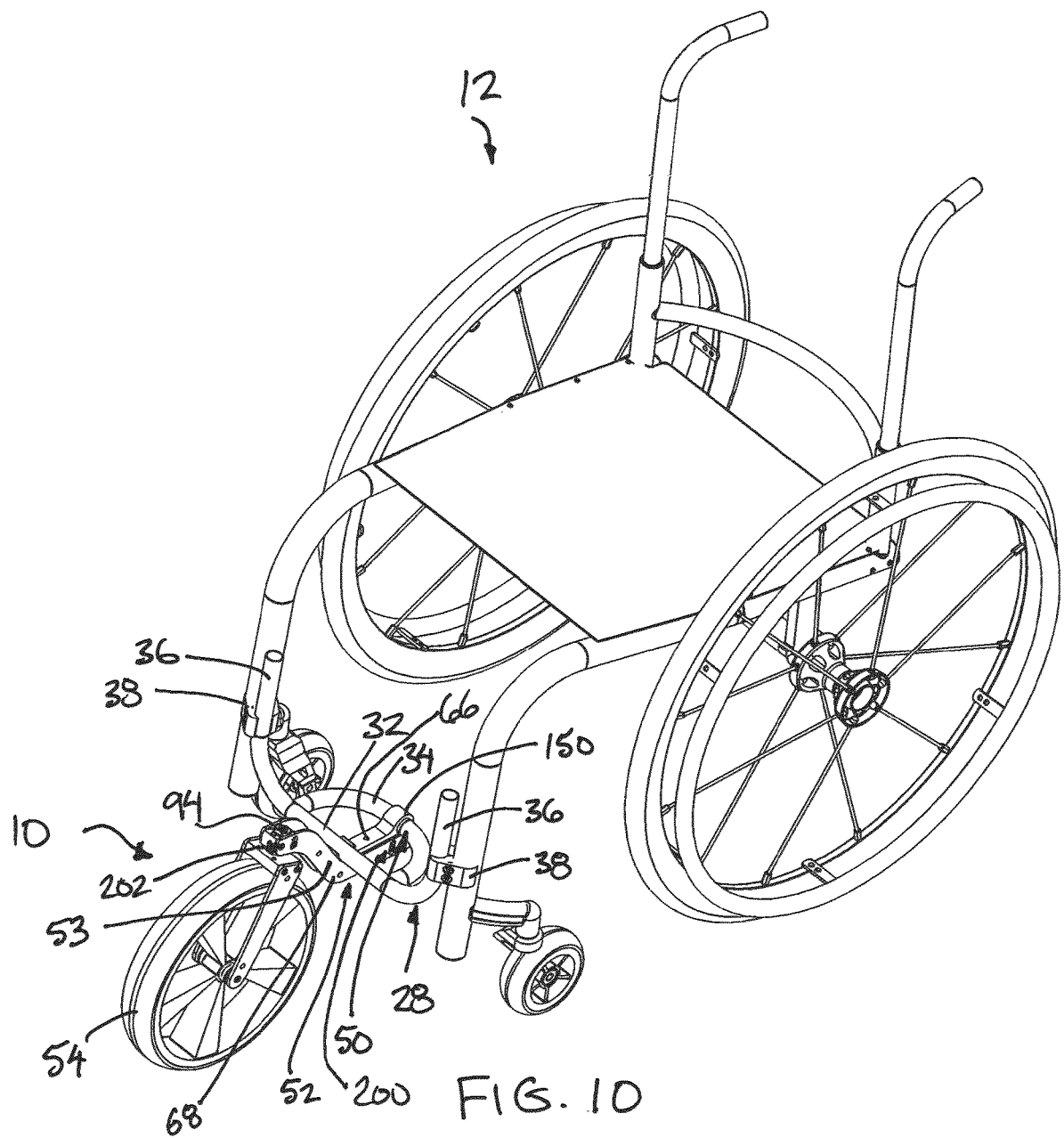
FIG. 10 is a perspective view of the auxiliary wheel assembly on the wheeled apparatus in the deployed position according to a further embodiment of the present invention.
Figure 11:
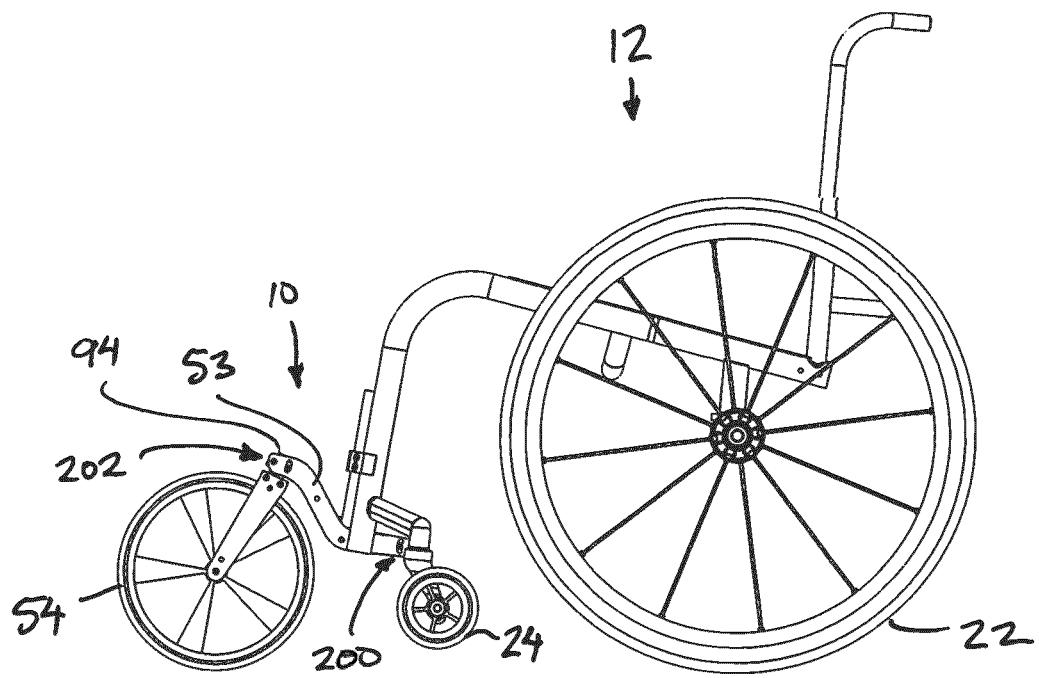
FIG. 11 is a side elevational view of the auxiliary wheel assembly on the wheeled apparatus in the deployed position according to the embodiment of FIG. 10.
Figure 12:
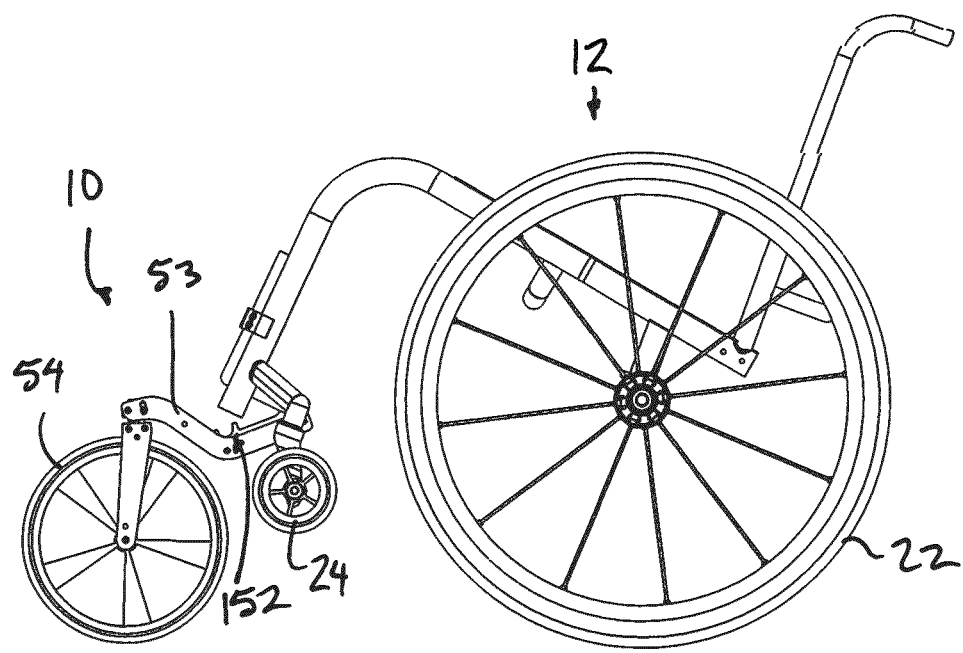
FIGS. 12 and 13 are side elevational view of the auxiliary wheel assembly on the wheeled apparatus at different stages partway between the deployed and stored positions according to the embodiment of FIG. 10.
Figure 13:
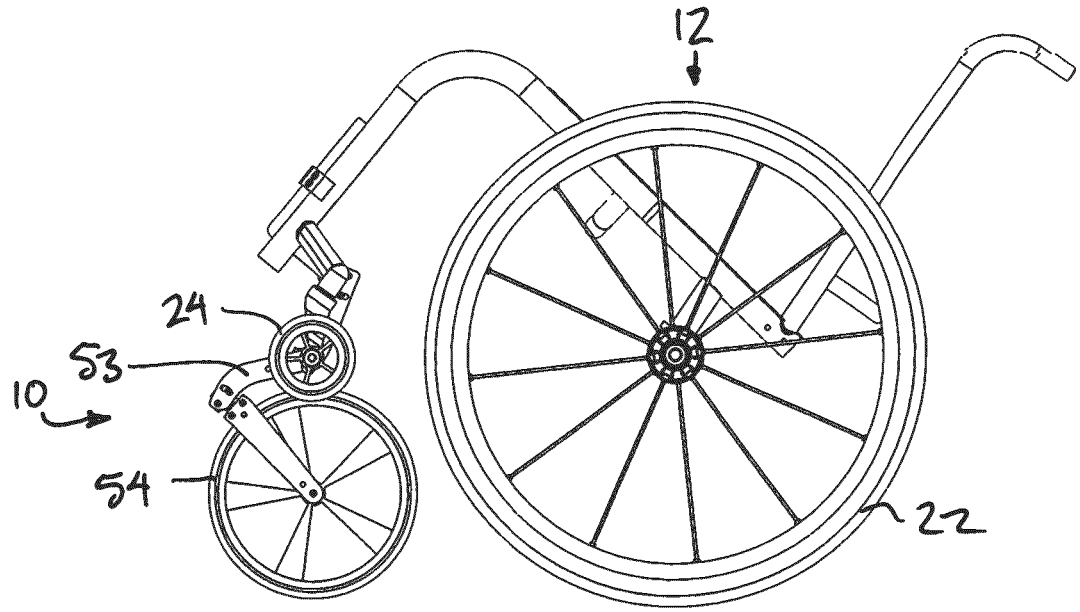

Alternatively, as shown in FIG. 10, the foot rest frame portion 28 may be substantially identical to the version shown in FIG. 1, with the exception of the posts 36 being adjustably supported on the respective front tubes 20 of the chair frame by additional clamping brackets 38 respectively rather than the posts 36 being telescopically received through the open bottom ends of the front tubes according to FIG. 1.

Figure 9:
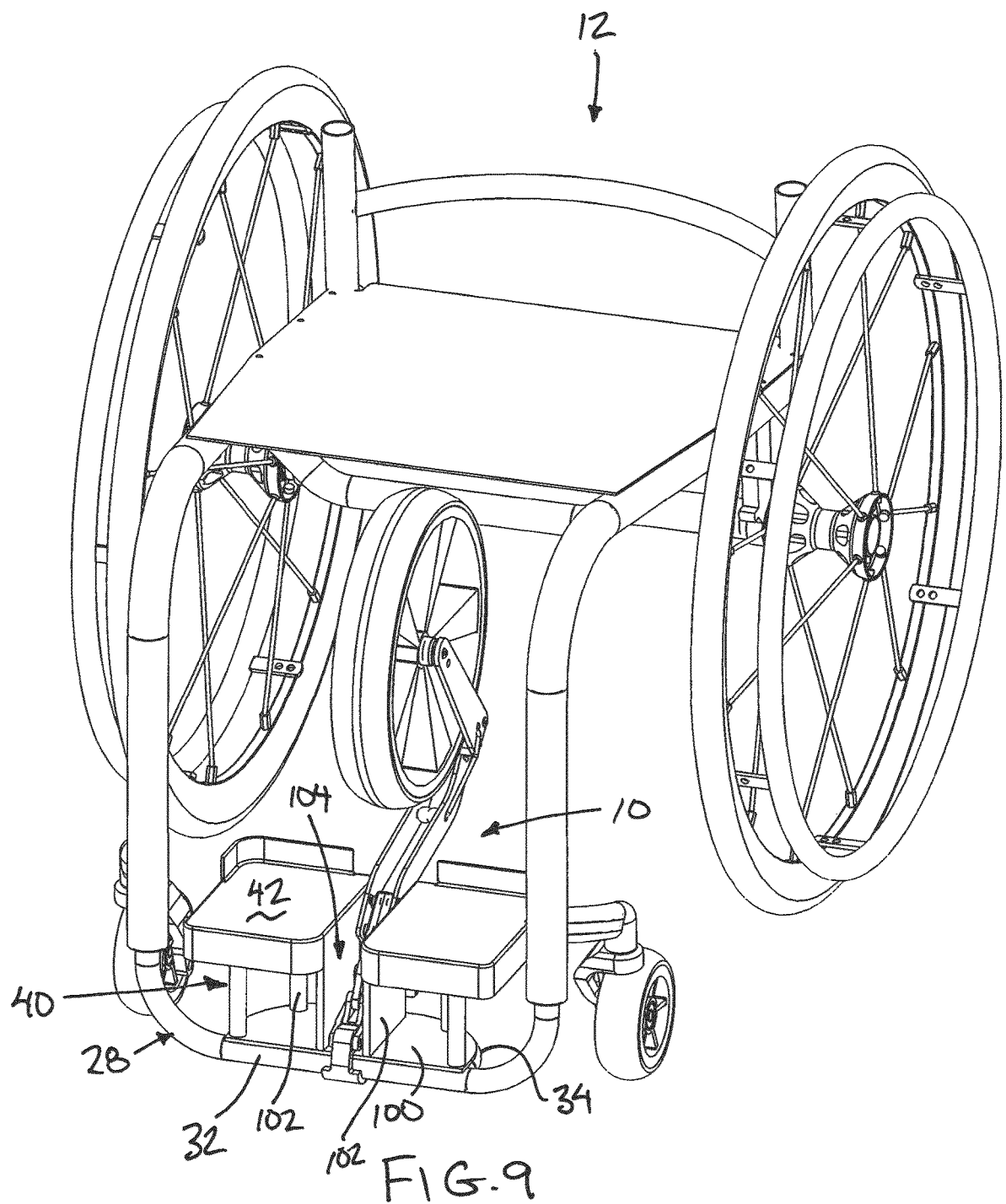
FIG. 9 is a perspective view of the auxiliary wheel assembly on the wheeled apparatus in the stored position according to a further embodiment of the present invention.

In a further embodiment as shown in FIG. 9, the foot rest frame portion 28 may be arranged substantially as shown in FIG. 1 however on additional riser structure 40 may be supported on the foot rest platform to define an additional riser platform 42 that supports the feet of the occupant thereon at an elevation spaced above the foot rest platform 30. Additional details of the riser structure 40 are described in further detail below.

Figure 15:
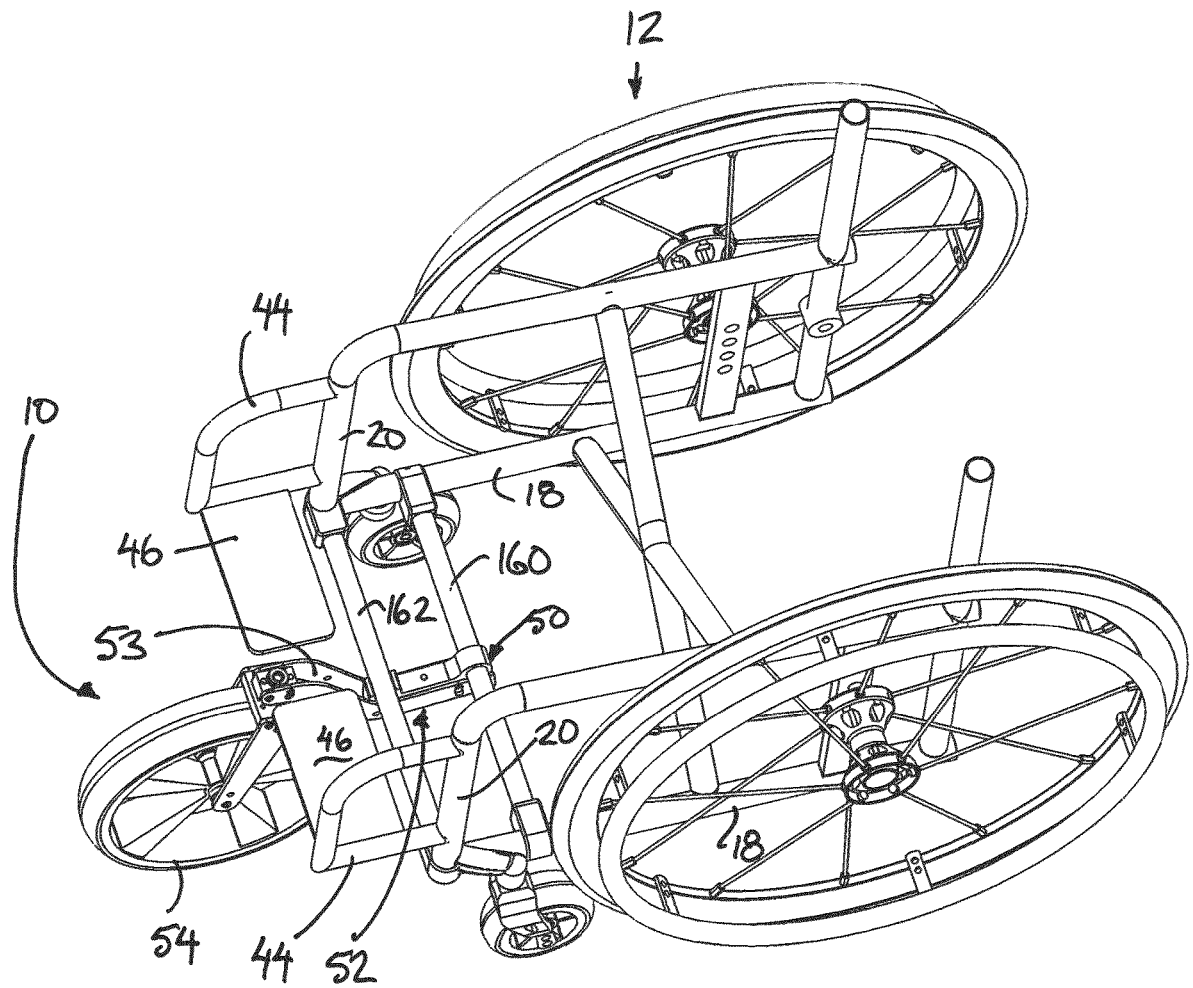
FIG. 15 is a perspective view of the auxiliary wheel assembly on the wheeled apparatus in the deployed position according to another embodiment of the present invention.

In a further embodiment, as shown in FIG. 15, the foot rest frame portion 28 may comprise two individual frame portions 44 supported on the two front tubes 20 respectively and each supporting a respective foot platform 46 thereon such that a central gap is provided between the 2 foot platforms 46 that may receive a portion of the auxiliary wheel assembly 10 therebetween in either one or both of the stored or deployed positions thereof.

Although various embodiments of the auxiliary wheel assembly 10 are illustrated in the accompanying figures and described in the following, the features in common with the various embodiments will first be described. In each instance the assembly includes a mounting arrangement 50 arranged to be secured at a fixed location on the chair frame, either on the foot rest frame portion 28 of the chair frame or a remaining portion of the chair frame which can include the front tubes 20 or other parts of the chair frame for example. The mounting arrangement 50 in the illustrated embodiments defines a pivotal connection that couples a linkage arrangement 52 to the chair frame 14 of the wheeled apparatus 12 such that the linkage arrangement is pivotal about a swing arm axis of the pivotal connection as the assembly 10 is displaced between deployed and stored positions respectively.

In further embodiments, the linkage arrangement may be connected to the mounting arrangement by a sliding or translating connection rather than a pivotal connection.

The assembly 10 further includes an auxiliary wheel 54 rotatably supported on the linkage arrangement 52 to be movable with the linkage arrangement between the deployed and stored positions thereof. Under normal operation, the auxiliary wheel is oriented for forward rolling movement in the direction of rolling movement of the rear wheels of the apparatus.

The linkage arrangement 52 in the illustrated embodiments includes a swing arm 53 which is pivotal relative to the chair frame about the swing arm axis of the pivotal connection defined by the mounting arrangement 50. Additional links, pivots, stops, and frame connections can be used in various combinations to further define the linkage arrangement that controls movement of the auxiliary wheel between the deployed and stored position thereof.

When in the deployed position, the auxiliary wheel 54 is arranged to be supported forwardly of the two front wheels of the wheelchair at a lower elevation than the two front wheels such that the apparatus is carried on a suitable supporting surface by the rear wheels and the auxiliary wheel only, while the front wheels are spaced above the supporting surface upon which the wheeled apparatus lies. Alternatively, when in the stored position, the auxiliary wheel is retracted rearwardly relative to the deployed position while being raised in elevation relative to the front wheels and the rear wheels of the apparatus such that the wheeled apparatus is carried on the supporting surface or ground therebelow only by the front wheels and rear wheels of the apparatus while the auxiliary wheel is spaced above the supporting surface or ground. The auxiliary wheel remains connected to the chair frame of the wheeled apparatus 10 by the linkage arrangement throughout displacement between the deployed and stored positions thereof.

In the deployed position, the linkage arrangement 52 extends primarily forward from the pivotal connection on the chair frame towards the auxiliary wheel 54 at the front end thereof. The front wheel is spaced forwardly of the chair frame such that the linkage arrangement and the auxiliary wheel supported thereon collectively protrude a prescribed protruding distance extending forwardly beyond an upright plane defined by the two front tubes 20 of the chair frame. More particularly the protruding distance is defined between the upright plane of the front end of the chair frame and the leading edge of the auxiliary wheel 54. In the stored position, the auxiliary wheel is retracted rearwardly relative to the chair frame so as to reduce the protruding distance by displacing of the auxiliary wheel by the movable linkage arrangement defined by the mounting arrangement 50 of the assembly.

Figure 14:
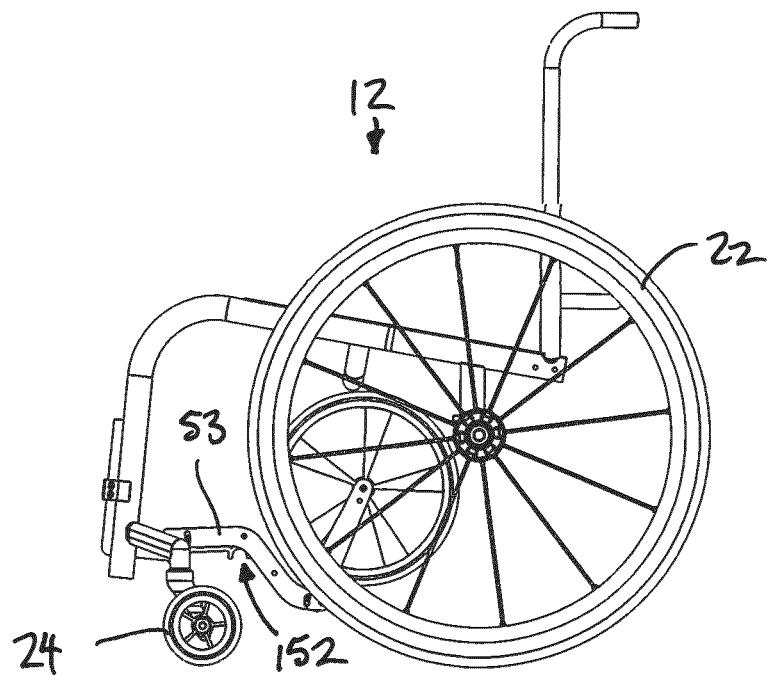
FIG. 14 is a side elevational view of the auxiliary wheel assembly on the wheeled apparatus in the stored position according to the embodiment of FIG. 10.

In preferred embodiments, the swing arm 53 is pivoted relative to the chair frame through an arc of at least 30° and preferably more than 50° so that the auxiliary wheel 54 is sufficiently retracted relative to the chair frame to minimize the protruding distance for maneuverability of the wheeled apparatus 12 when the assembly 10 is stored. In some embodiments, the swing arm may move through a range of 90° from the deployed position to the stored position, whereas in other embodiments the swing arm may be pivoted through a range of approximately 180° as shown in FIG. 10 for example. Manoeuvrability of the wheelchair is substantially improved when the protruding distance is reduced by at least 30%, and preferably more than 50% resulting in the auxiliary wheel being partly retracted relative to and partly traversed through the upright plane at the front tubes 20 of the chair frame; however, in some instances the auxiliary wheel and the linkage arrangement 52 upon which it is supported may be retracted relative to the chair frame so that the protruding distance is reduced by 100% with the auxiliary wheel 54 being fully retracted through the upright plane defined by the front tubes 20 of the chair frame. In some instances, the auxiliary wheel and the linkage arrangement 52 upon which it is supported may be retracted even further relative to the chair frame so that the auxiliary wheel 54 is behind the foot rest frame portion 28, as shown in FIG. 14.

In preferred embodiments, the linkage arrangement is biased towards the deployed position once the auxiliary wheel is positioned in proximity to the deployed position and the front of the wheelchair is deweighted, that is the wheelchair is tilted so that the front wheels are lifted from the ground. The bias may also act to bias the linkage arrangement towards the stored position when in proximity to the stored position when the biasing arrangement passes through an intermediate over center position. In this instance, gravity acting on the auxiliary wheel may be sufficient to bias the final displacement of the linkage assembly into the deployed position, or alternatively a resilient spring member may be used to provide additional bias to automatically displace the linkage arrangement and the auxiliary wheel into the deployed configuration. In addition to the swing arm, the linkage arrangement may further include a locking linkage 56 that is operatively connected between the swing arm 53 and the mounting arrangement 50 or another portion of the chair frame which serves to lock and retain the swing arm in the deployed position when the locking linkage 56 is similarly displaced into the deployed position thereof. Components of the locking linkage 56 may incorporate a resilient spring member therein to bias the locking linkage 56 into the deployed configuration which in turn biases the linkage arrangement as a whole into the deployed position.

Turning now more particularly to the first embodiment shown in FIGS. 1 through 5, the mounting arrangement 50 in this instance comprises a mounting frame 58 that is clamped in fixed relation onto the foot rest frame portion 28 of the chair frame. In particular the mounting frame 58 includes a longitudinal frame member 60 which is adjustable in length between opposing front and rear ends thereof. Suitable fasteners allow the length to be locked at a selected length. A hook 62 is formed at the front end of the frame member 60 for hooking over the front side of the front bar 32 of the foot rest frame portion 28. A clamp member 64 is mounted at the rear of the frame member and includes a clamping jaw movable relative to the frame member between clamped and released positions for selectively engaging a rear of the rear bar 34 of the foot rest frame portion in a mounted position on the chair frame. The clamp assembly may include a suitable four bar linkage with an actuating lever that is displaced over centre for clamping and releasing (i.e. a standard industry "hold-down toggle" clamp) the clamp 64 to selectively clamp the foot rest platform 30 between the hook 62 and the clamp 64 of the mounting frame 58 respectively. The longitudinal frame member 60 is adjustable in length between the hook and the clamp for accommodating different sizes of platforms on different wheelchairs. Thus, even though the auxiliary wheel assembly 10 is capable of staying fixed to the support frame of the wheeled apparatus by mounting arrangement 50, and maintaining a typical and useful operating footprint and maneuverability when retracted and stored, the auxiliary wheel assembly 10 can be quickly disconnected from the wheeled apparatus when desired.

In the first embodiment of FIGS. 1 through 5, the linkage arrangement includes the swing arm 53 typically located at the rear end thereof at the pivot location defined above the longitudinal frame member 60 of the mounting frame between the front and rear ends thereof. The swing arm 53 includes (i) an inner arm portion 66 forming part of a four-bar linkage together with the mounting frame 58 and (ii) an outer arm portion 68 spanning a majority of the length of the swing arm between the pivotal connection on the mounting frame 58 at an inner end of the swing arm and the auxiliary wheel rotatably supported at the outer end of the swing arm. The four-bar linkage further includes a first intermediate link 70 and a second intermediate link 72 pivotally coupled between the mounting frame 58 and the swing arm 53 respectively.

The first intermediate link 70 is defined by two parallel and spaced apart link members at opposing sides of the inner arm portion 66 of the swing arm received therebetween which are coupled in fixed relation to one another to be pivotal together at a first end of the link about a first axis on the mounting frame 58. The first intermediate link extends generally upward from the first axis in the deployed position and extends upward in a more rearward orientation in the stored position.

The second intermediate link 72 also comprises two parallel and spaced apart link members at opposing sides of the inner arm portion 66 of the swing arm received therebetween, which are coupled in fixed relation to one another to be pivotal together relative to the swing arm and the first intermediate link. The link members of the first intermediate link 70 are spaced apart by a greater distance than the link members of the second intermediate link 72 so that both link members of the second intermediate link 72 can pass by between the link members of the first intermediate link as the linkage is displaced between deployed and stored position thereof. The second intermediate link extends between a first end pivotally coupled on the swing arm and a second end pivotally coupled on the first intermediate link. The second intermediate link 72 is pivotal relative to the first intermediate link 70 about a second axis while the first end of the second intermediate link is pivotal on the swing arm about a third axis.

In the stored position of the linkage arrangement, the second intermediate link 72 is positioned such that the third pivot axis 74 is situated above the swing arm axis 76 and rearward of the first pivot axis 78 while the second pivot axis 80 is spaced rearward of both the swing arm axis 76 and the third axis 74. The inner arm portion 66 of the swing arm extends upward at a rearward slope.

A handle member 82 is formed integrally with the first intermediate link 70 to extend in the longitudinal direction of the first link from the first axis 78 to the second axis 80 thereof. More particularly the handle member 82 extends longitudinally beyond the second axis 80 to extend upward at a rearward slope in the stored position.

In order to displace the linkage into the deployed position, a top end of the handle member 82 is displaced forward into a more upright orientation while the swing arm 53 is correspondingly displaced forwardly and downwardly to displace the auxiliary wheel into the deployed position. In doing so the third axis 74 moves downward with the swing arm, while the second axis 80 is displaced forwardly over top of the third axis 74 until the third axis 74 crosses through a plane that is occupied by the first axis 78 and the second axis 80 so that the linkage arrangement is displaced through an over-centre position as the linkage arrangement reaches the deployed position.

A stop 83 is formed on the inner arm portion 66 of the swing arm 53 at a location to be engaged by the second intermediate link 72 in the deployed position. The stop acts to stop further movement of the linkage arrangement away from the stored position beyond the deployed position.

The linkage arrangement further includes a resilient spring member 84 connected between the handle member 82 spaced above the second axis 80 of the first intermediate link 70 and the swing arm 53 at a location spaced forwardly of the third axis 74 such that the spring 84 is mounted under tension. As the spring member is mounted under tension, it provides a force pulling the handle member and the swing arm towards one another between two mounting locations which are shortened in distance relative to one another as the linkage arrangement reaches the deployed position such that the spring member 84 act to bias the swing arm and the components of the four-bar linkage that define the locking linkage 56 in this embodiment.

In operation, the occupant may deploy the auxiliary wheel assembly by initially displacing the auxiliary wheel from the stored position to an intermediate position in proximity to the deployed position so that the auxiliary wheel rests on the ground while the weight of the user remains carried on the front wheels of the chair frame. The occupant may subsequently deweight the front end of the wheeled apparatus by lifting the front wheels from the ground so that gravity acts on the auxiliary wheel and swing arm to bias displacement into the fully deployed position while the spring member 84 also acts to displace the swing arm and the associated locking linkage 56 into the deployed position thereof. The deweighting action is typically performed as the user "popping" the front of the wheelchair up by lifting the front wheels from the ground by shifting their weight rearward, and sometimes (but not necessarily) pushing the wheelchair forward at the same time. This action is similar (and can also be) a "wheelie", a well-known wheelchair skill in the industry. Alternatively, a caregiver (e.g. a parent of a child occupant in a wheelchair or stroller), can perform this deweight action by hanging onto the push handles shown at the rear of the chair frame 14 and pushing down, thereby lifting the front wheels from the ground. Alternatively, in the embodiment of a rollator in FIG. 22, the rollator user can similarly perform the deweight action by hanging onto the push handles 202 and pushing down. This lifting action of the front end of the chair frame alone is sufficient to allow (i) the swing arm to automatically move into the fully deployed position under bias and (ii) the locking linkage to be automatically engaged into a locked or engaged position in response to the swing arm being displaced into the deployed position thereof.

If the front end of the wheelchair is only lifted to an elevation of the front wheels above the ground that corresponds to the height of the front wheels in the working position, then the deployment of the swing arm into the fully deployed position will result in the auxiliary wheel contacting the ground and subsequently supporting the front end of the wheelchair thereon when the user resumes applying weight to the front end of the wheelchair.

Alternatively, if the front end of the wheelchair is lifted to an elevation of the front wheels above the ground that exceeds their height in the working position, then the auxiliary wheel will be spaced above the ground when initially swung into the deployed position before weight is reapplied to the front end of the chair frame. In this instance, reapplying weight onto the front end of the wheelchair once the auxiliary wheel is in the deployed position will lower the wheelchair onto the auxiliary wheel if the auxiliary wheel is spaced above the ground, and will transfer weight at the front end of the wheelchair onto the auxiliary wheel while supporting the front wheels of the wheelchair in spaced relationship above the ground.

In either instance, the biasing arrangement of the locking linkage 56 in the deployed position serves to retain the linkage in the deployed position while the auxiliary wheel is in use.

Releasing the locking linkage 56 allows the swing arm to be displaced away from the deployed position initially by placing downward weight onto the front of the wheelchair to lower the front wheels of the wheelchair to the ground. Once the locking linkage is released and the swing arm has been displaced partway away from the deployed position, the swing arm can be freely pivoted back to the stored position.

As further shown in the embodiment of FIGS. 1 through 5, the outer arm portion 68 of the swing arm may comprise two parallel plates 86 which are parallel and spaced apart from one another at opposing sides of the inner arm portion 66. The inner ends of the plates 86 can be fastened in fixed relation to the inner arm portion 66 using fasteners received through elongated slots to allow angular orientation between the inner and outer arm portions to be adjusted relative to one another about a horizontal axis parallel to the swing arm axis. This functions to vary the elevation of the auxiliary wheel supported at the outer end of the swing arm relative to the mounting frame fixed onto the front end of the wheelchair frame which in turn varies the supported elevation of the front wheels of the wheeled apparatus above the ground in the deployed position of the assembly.

A crossbar 88 may be coupled between the two plates at an intermediate location between the inner arm portion 66 at the inner end and the auxiliary wheel at the outer end for additional structural support between the plates. Multiple mounting apertures may be provided to support the crossbar at various distances from the swing arm axis depending upon the diameter of the auxiliary wheel.

The auxiliary wheel is rotatably supported on an axle 90 which is fastened at opposing ends onto the outer ends of the two plates 86 respectively. A plurality of different mounting apertures may be provided at the outer end of each plate 86 to vary the elevation of the auxiliary wheel relative to the swing arm in the deployed position to also provide adjustment of the suspended height of the front wheels of the wheelchair in the deployed position if desired. The auxiliary wheel is fixed and orientation relative to the swing arm in the first embodiment.

Figure 6:
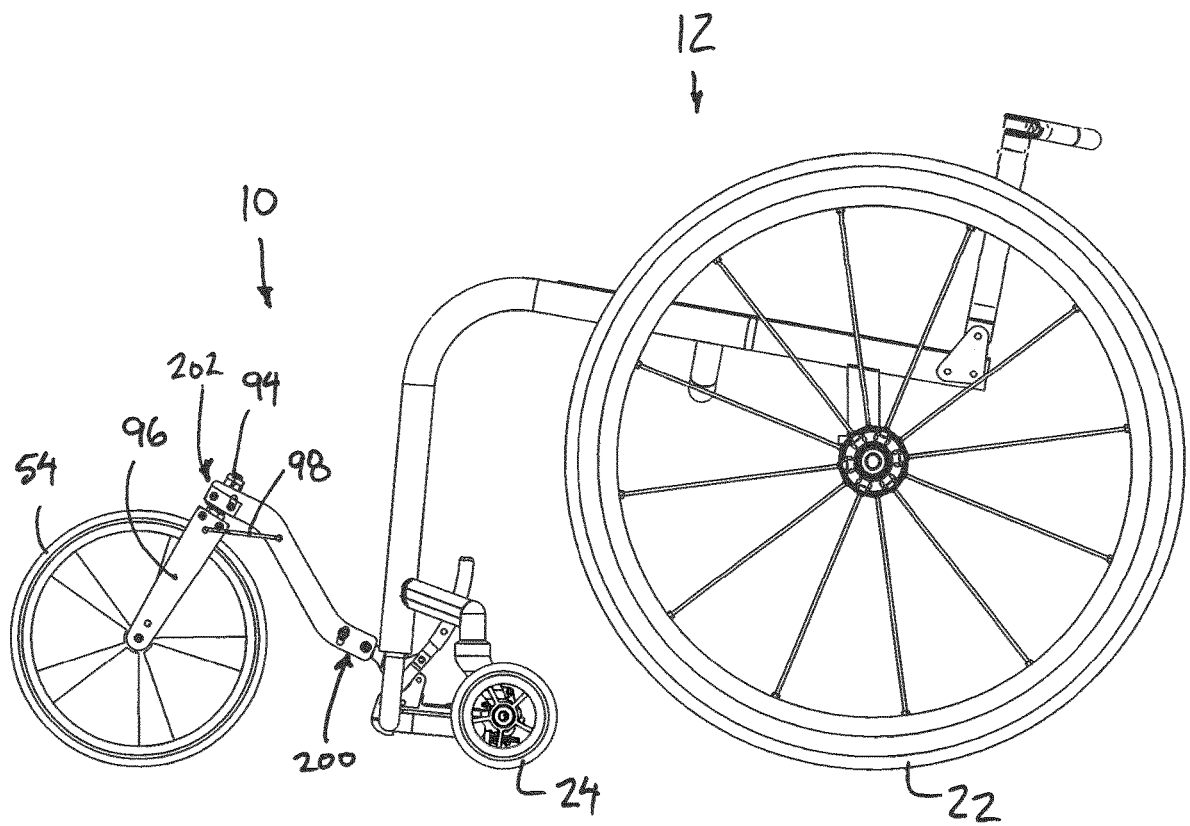
FIG. 6 is a side view of the auxiliary wheel assembly on the wheeled apparatus in the deployed position according to a second embodiment of the present invention.
Figure 7:
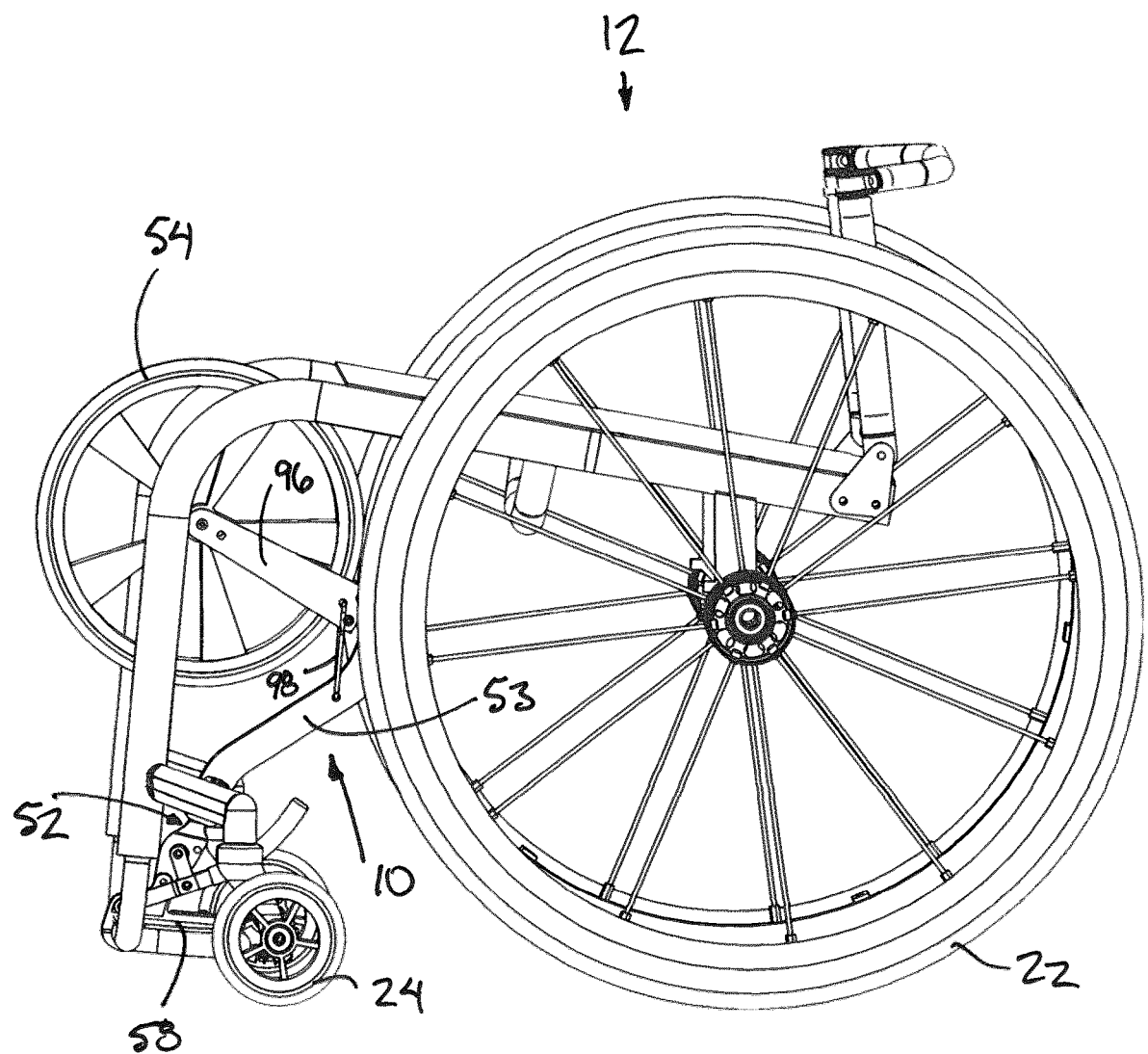
FIG. 7 is a side view of the auxiliary wheel assembly on the wheeled apparatus in the stored position according to the second embodiment of FIG. 6.
Figure 8:
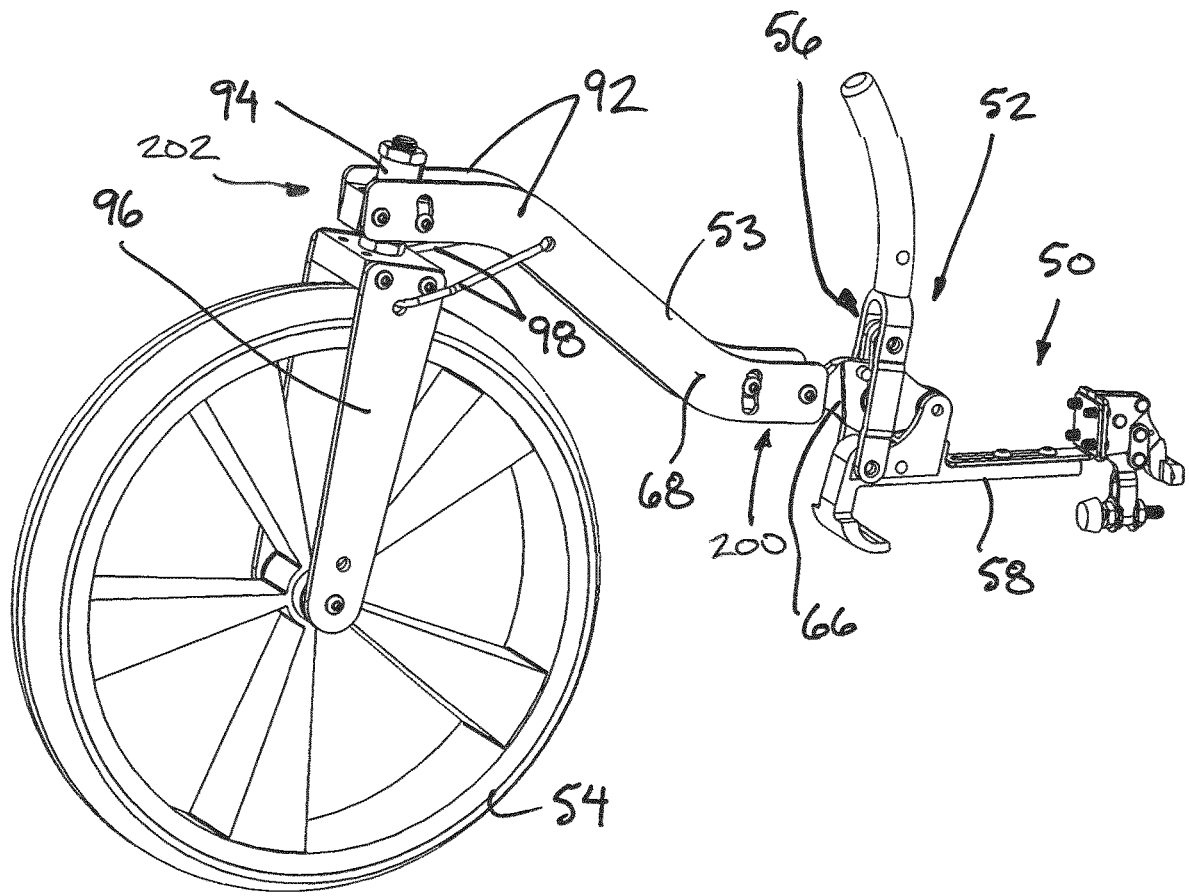
FIG. 8 is a perspective view of the auxiliary wheel assembly in the deployed position according to the second embodiment of FIG. 6.

Turning now to a second embodiment shown in FIGS. 6 through 8, the mounting arrangement 50 comprising a mounting frame 58 and the linkage arrangement 52 including a swing arm 53 and an associated locking linkage 56 are substantially identical to the previous embodiment. This embodiment differs primarily in the configuration of the outer arm portion 68 of the swing arm. In this instance the outer arm portion again comprises two parallel plates 92 which are mounted for angular adjustment relative to the inner arm portion 66 using elongated fastener slots, however the plates defining the outer arm portion 68 in this instance extend forwardly at an upward slope in the deployed position. This is in contrast to the outer arm portion in the embodiment of FIGS. 1 through 5 which are sloped downwardly and forwardly in the deployed position.

In the second embodiment of FIGS. 6 through 8, the outer arm portion 68 of the swing arm extends upwardly and forwardly in the deployed position for connection to a swivel 94 that supports the auxiliary wheel 54 therebelow for pivotal movement about an upright steering axis of the swivel. The outer housing of the swivel 94 is coupled between the plates 92 using fasteners extending through elongated slots to fix the orientation of the steering axis of the swivel through a range of upward and rearward slopes. The swivel 94 supports a fork 96 therebelow which support the auxiliary wheel 54 between the bottom ends of opposing sides of the fork 96. A pair of resilient spring members 98 are joined on to opposing sides of the fork 96 respectively for connection at opposing ends of the spring members onto respective sides of the swing arm at a location spaced rearward of the swivel. The pair of springs 98 are mounted under tension at opposing sides of the upright steering axis to provide balanced biasing forces that tend to bias the rolling orientation of the auxiliary wheel to a neutral position arranged for forward rolling movement in the same direction as the rear wheels of the wheeled apparatus 12. The auxiliary wheel remains pivotal relative to the swing arm about the upright steering axis of the swivel 94 when steering the wheeled apparatus, however the balanced springs 98 act to re-centre the wheel to the neutral position in the absence of off axis forces from steering movement of the wheeled apparatus. It is also possible that a steering arm be connected to the swivel 94 such that an occupant can turn the auxiliary wheel 54 in a fashion analogous to a bicycle. The steering arm may be connected to the swivel 94 with a pivot, allowing the steering arm to move up and down as desired by the occupant. The steering arm may have a handle for single-hand use, or handle bars for two-handed use.

Turning now to FIG. 9, the arrangement of the auxiliary wheel assembly 10 is substantially identical to the previous embodiment with the exception of the additional riser structure 40 supported on the foot rest frame portion. In order to maximize clearance of the auxiliary wheel passing under the seat of the wheeled apparatus, the foot rest frame portion 28 may be supported at the lowest elevation relative to the chair frame regardless of the desired height of the foot rest platform for the occupant. If greater elevation of the foot rest platform relative to the chair frame is desired, the additional riser structure 40 can be mounted on the foot rest platform 30 in a manner which does not interfere with operation of the auxiliary wheel assembly 10 between the stored and deployed position thereof. More particularly, the riser structure includes a base portion 100 adapted to be mounted onto the existing foot rest platform 30 and one or more upright elements 102 extending upward from the base structure to support the riser platform 42 spaced above the base. The riser platform includes two side portions which are spaced apart by a central gap 104 in the lateral direction in alignment with the auxiliary wheel assembly 10. The upright elements 102 are similarly spaced apart from one another to provide a clearance gap in alignment with the gap 104 in the riser platform 42. The two side portions of the riser platform support the feet of the occupant thereon while the auxiliary wheel assembly 10 remains operational within the gap in the stored position and while being displaced between the stored and deployed positions. Different riser structures having different heights can be interchangeably mounted relative to one another on the foot rest frame portion 28 to adjust the height of the platforms supporting the feet of the user thereon despite the foot rest frame portion 28 remaining fixed at the lowest positioning thereof relative to the chair frame.

Figure 16:
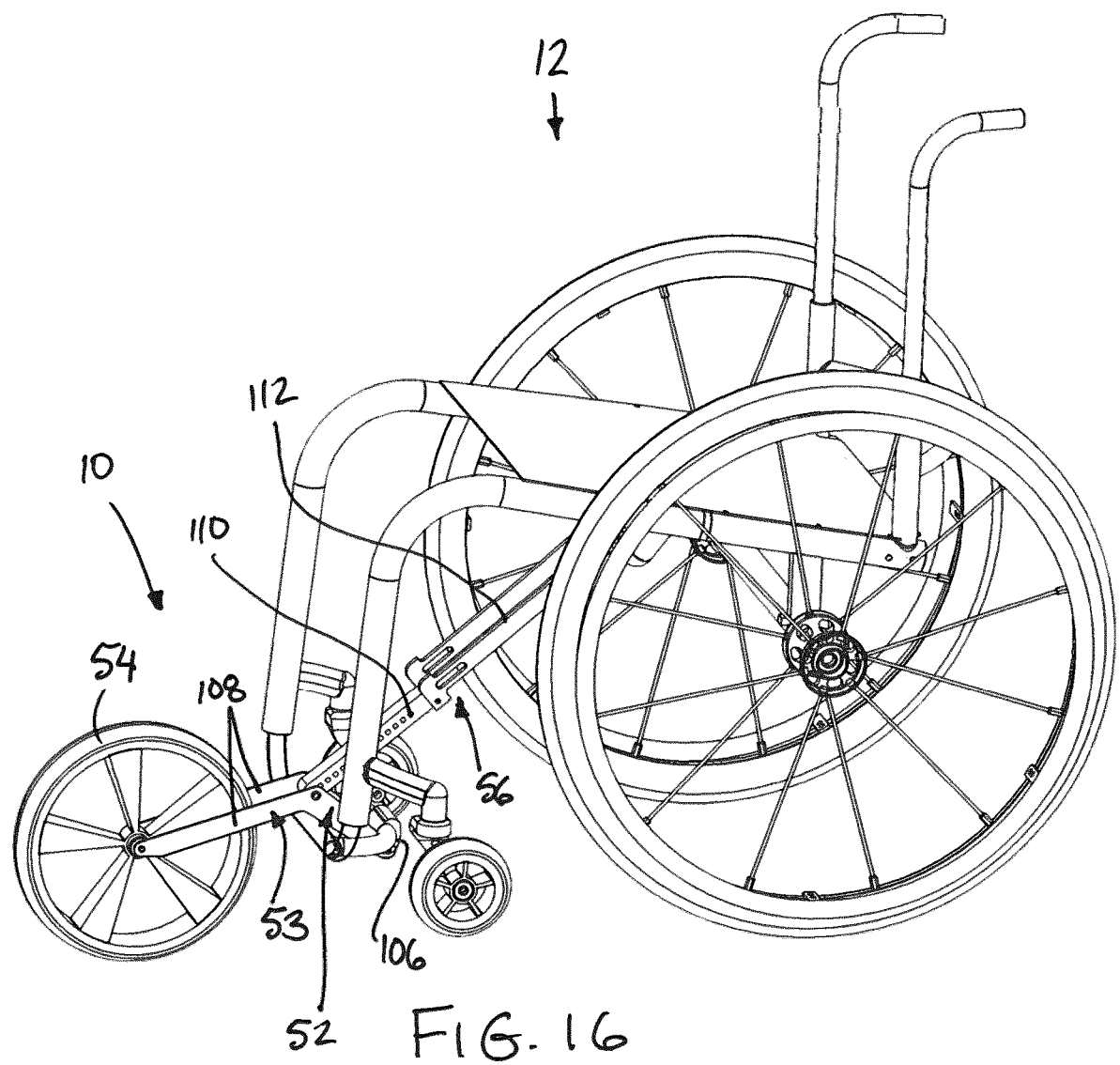
FIG. 16 is a perspective view of the auxiliary wheel assembly on the wheeled apparatus in the deployed position according to a further embodiment of the present invention.
Figure 17:
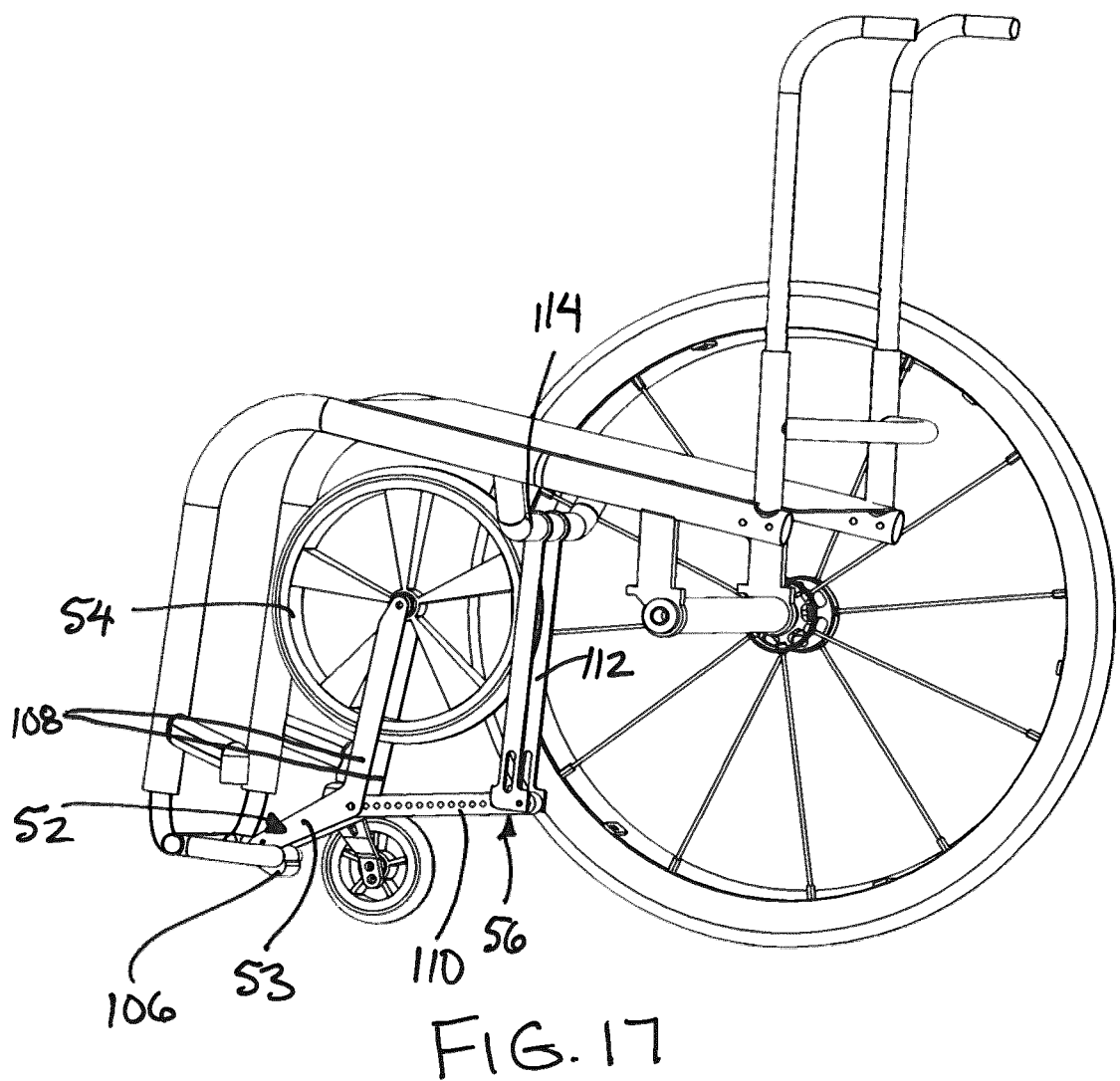
FIG. 17 is a perspective view of the auxiliary wheel assembly on the wheeled apparatus in the stored position according to the embodiment of FIG. 16.

Turning now to FIGS. 16 and 17, the mounting arrangement in this instance comprises a mounting bracket 106 which clamps rotatably about the rear bar 34 of the foot rest portion 28 of the chair frame and which mounts the inner end of the swing arm 53 thereon so that the pivoting of the mounting bracket 106 itself about the rear bar 34 defines the pivotal connection of the swing arm 53 relative to the chair frame. The swing arm 53 in this instance comprises two parallel plates 108 which are fixed at the inner end thereof on the mounting bracket 106 and which support the auxiliary wheel 54 rotatably therebetween at the opposing outer end. In this instance, the swing arm is a bent arm which extends upwardly and forwardly along a rear portion and downwardly and forwardly along a forward portion to provide clearance over the front bar 32 of the foot rest frame portion 28 in the deployed position of the assembly. The rolling orientation of the auxiliary wheel is fixed relative to the swing arm in this instance, however in further embodiments a swivel arrangement similarly to some of the other embodiments described herein may be used.

In addition to the swing arm 53, the linkage arrangement in this instance again comprises a locking linkage 56 in which the locking linkage includes a first link 110 and a second link 112 which are folded relative to one another in the stored position and which are extended in the deployed position. The locking linkage 56 in this instance is pivotally connected to a crossbar 114 of the chair frame extending between the two side frame portions thereof below the seat of the apparatus. The mounting arrangement thus includes a pivotal connection of the locking linkage 56 onto the crossbar 114 of the chair frame independently of the mounting bracket 106 that defines the pivotal connection of the swing arm 53 relative to the foot rest frame portion 28 of the chair frame. The first link 110 is pivotally coupled at one end onto the swing arm 53 at a location above the front bar 32 in the deployed position to extend upwardly and rearwardly from the swing arm. The second link 112 it pivotally connected at the upper end of the first link 110 to extend upwardly and rearwardly to the opposing end thereof that is pivotally mounted on the crossbar 114 of the chair frame. In the deployed position, the first and second links are extended end to end with one another in substantial longitudinal alignment with one another to provide bracing which resists upward deflection of the swing arm from the deployed position. Displacing the pivotal connection between the links downwardly and rearwardly as the links are folded from the deployed position to the stored position allows upward displacement of the swing arm into the stored position. Various additional operating components such as latches or biasing members may be used to lock the links in the extended configuration or bias the links towards the extended configuration which in turn locks and/or biases the linkage arrangement supporting the auxiliary wheel 54 into the deployed position thereof.

Figure 19:
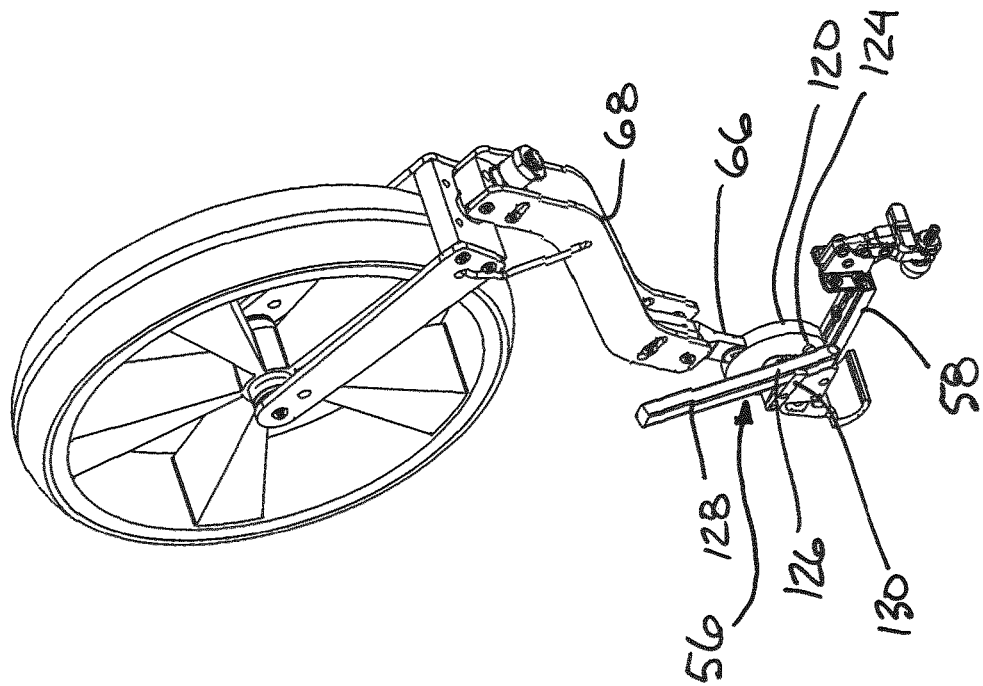
FIG. 19 is a perspective view of the auxiliary wheel assembly in the stored position according to the embodiment of FIG. 18.
Figure 18:
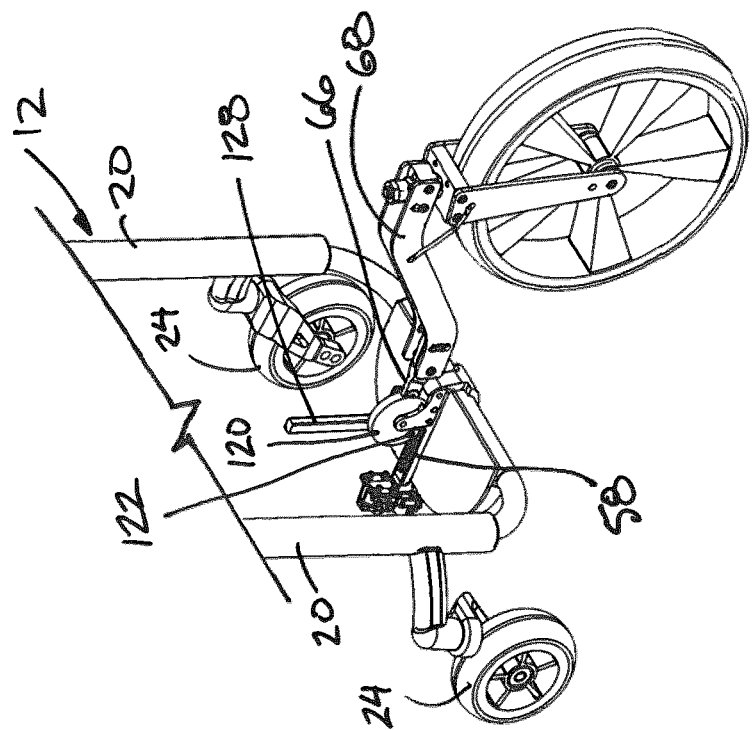
FIG. 18 is a perspective view of the auxiliary wheel assembly on the wheeled apparatus in the deployed position according to yet a further embodiment of the present invention.

Turning now to FIGS. 18 and 19, in this instance the mounting arrangement comprises a mounting frame 58 which is identical to the mounting frame in the embodiment of FIGS. 1 through 5. The outer portion of the swing arm 53 is substantially identical to the outer arm portion 68 described in the embodiment of FIGS. 6 through 8. In the embodiment of FIGS. 18 and 19, the inner arm portion 66 of the swing arm in this instance remains pivotal on the mounting frame, however a latching assembly is provided to selectively latch the swing arm in the deployed position. The latching assembly includes a disc body 120 formed on the inner arm portion of the swing arm about the swing arm axis for locating a latching aperture 122 therein. The latching assembly further includes a pin 124 carried on an actuating arm 126 that is hinged onto the mounting frame. More particularly the actuating arm 126 is pivoted at the bottom end thereof on the mounting frame while locating the pin 124 is supported on an intermediate location on the arm 126, while the actuating arm extends above the pin and the disc body to form an upwardly protruding handle 128 at the outer end thereof. The hinge of the actuating arm allows the pin 124 to be displaced towards and away from the disc body 120 in a lateral direction as the actuating arm is pivoted relative to the mounting frame. A spring member 130 is operatively connected between the actuating arm 126 and the mounting frame to bias the pin 124 against the disc body. The latching aperture 122 is located in the disc body 124 alignment with the pin only in the deployed position of the swing arm. An additional locking aperture may be provided at a different location on the disc body for alignment with the pin to selectively latch the swing arm when in the stored position. In the illustrated embodiment, the pin merely abuts the side surface of the disc body in the stored position. When approaching the stored position, the centre of gravity of the swing arm is displaced over centre from a position forward of the swing arm axis to a position rearward of the swing arm axis so that gravity alone is sufficient to retain the swing arm in the stored position. When it is desired to displace the assembly into the deployed position, the user merely pushes the swing arm forward until the auxiliary wheel abuts the ground while the weight at the front of the wheeled apparatus remains on the front wheels of the apparatus. From this intermediate position, the user deweights the front end of the wheeled apparatus by raising the front wheels from the ground so that gravity alone is sufficient to further pivot the auxiliary wheel 54 downward relative to the chair frame into the fully deployed position. Upon reaching the fully deployed position, the pin 124 aligns with the aperture 122 on the disc body and the spring 130 biases the pin into the aperture to automatically lock the assembly in the deployed position. The latching assembly thus defines the locking linkage 56 in this embodiment. To return to the stored position, the user simply deflects the handle portion 128 of the actuating arm carrying the pin 124 thereon to release the pin from the aperture on the disc body. The weight of the user at the front of the wheeled apparatus will cause the front wheels to be lowered into engagement with the ground thus moving the pin into misalignment with the aperture so that the assembly is no longer latched. The user may then simply manually grasp the swing arm and displace the swing arm freely from the intermediate position to the stored position thereof while the pin freely slides along the side surface of the disc body 120.

Figure 20:
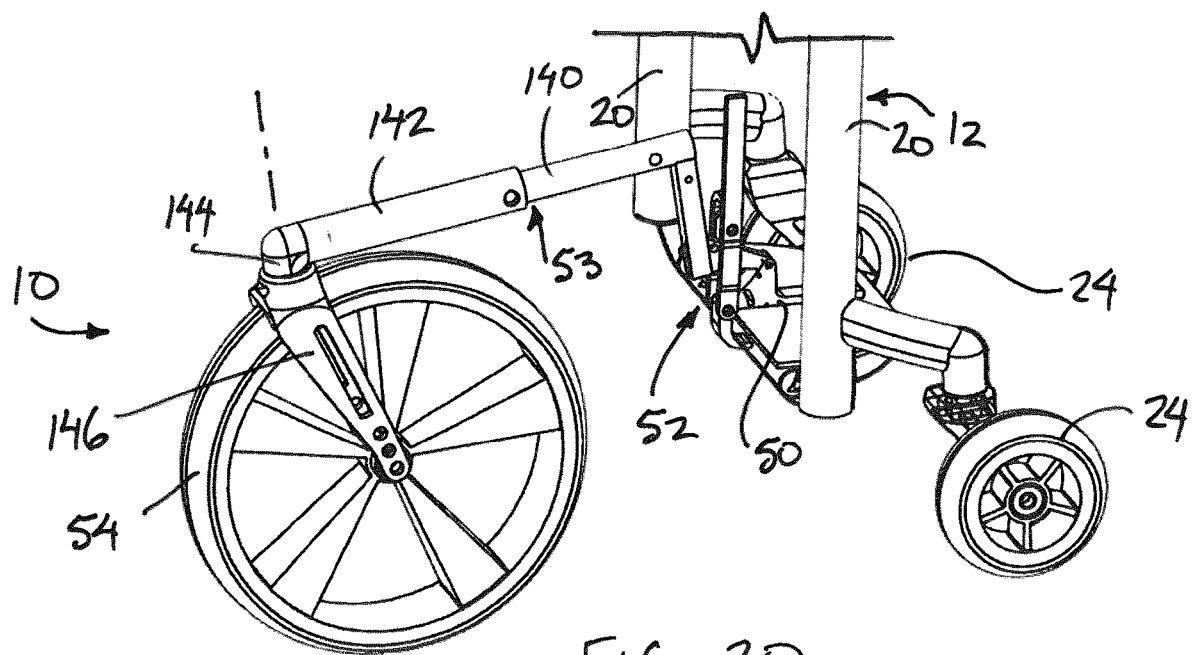
FIG. 20 is a perspective view of the auxiliary wheel assembly on the wheeled apparatus in the deployed position according to yet another embodiment of the present invention.
Figure 21:
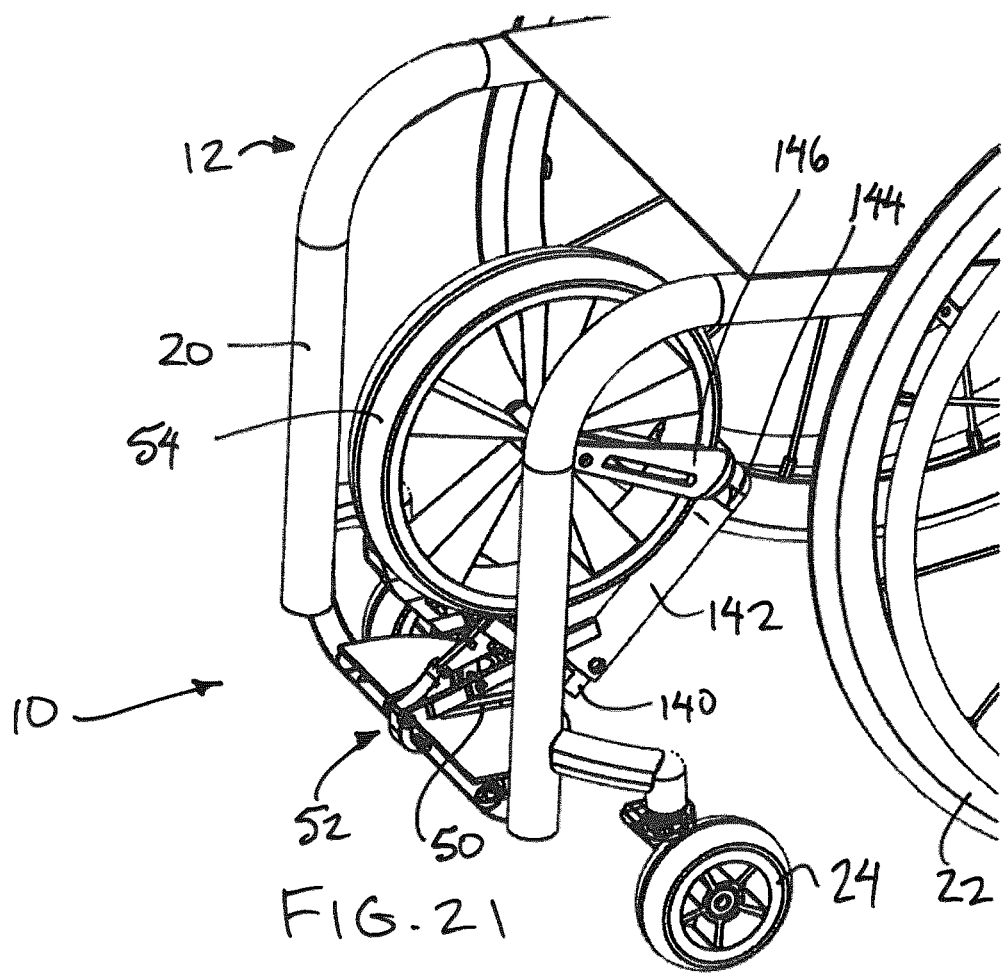
FIG. 21 is a perspective view of the auxiliary wheel assembly on the wheeled apparatus in the stored position according to the embodiment of FIG. 21.

Turning now to FIGS. 20 and 21, the assembly 10 in this instance may again comprise a mounting frame arranged to be fixed onto the foot rest frame portion of the chair frame of the apparatus with the locking linkage 56 being substantially as described in the embodiment of FIGS. 1 through 5 for retaining the swing arm 53 in the deployed position. The outer arm portion 68 of the swing arm differs from the previous embodiments in this instance by comprising inner and outer tube sections 140 and 142 which are telescopic relative to one another so as to vary the overall length of the swing arm. Typically, the length of the swing arm is only retracted to better enable storage of the assembly under the seat of the wheeled apparatus without interference with the seat. The assembly 10 in the embodiment of FIGS. 20 and 21 also differs in the mounting of the auxiliary wheel 54 relative to the swing arm 53. A swivel 144 is mounted at the outer end of the swing arm to support a fork 146 extending therebelow upon which the auxiliary wheel is mounted for rotation about a corresponding wheel axis. The swivel supports the fork and the auxiliary wheel thereon for pivotal movement about an upright steering axis relative to the swing arm for steering motion of the auxiliary wheel 54. The fork is oriented with a downward and rearward slope so that the fork 146 supports the wheel axis of the auxiliary wheel 54 in a trailing relationship, spaced rearward of the steering axis of the swivel 144. This manner of arranging a swivel and fork supporting a wheel is analogous to a conventional caster wheel. The swivel may be mounted such that it is perpendicular to the floor to maintain the raised height of the front wheels of the wheelchair throughout any turning motion including backwards, although this is not absolutely necessary.

In operation, the assembly is typically initially stored with the swing arm in a retracted position having a minimum length. To deploy the assembly, the swing arm is pivoted partway towards the deployed position so that the swing arm can be extended to a configuration of maximum length by extending the outer tube 142 relative to the inner tube 140. A sprung pin may cooperate with corresponding apertures in the inner and outer tubes to selectively and releasably retain the swing arm in the extended or retracted position thereof. Once pinned in the extended position, the user can continue to pivot the swing arm forwardly and, if desired, use the handle of the linkage arrangement to assist in urging the linkage arrangement into the deployed position while the user removes weight from the front wheels of the wheeled apparatus in a manner similar to previous embodiments. In preferred embodiments, the biasing of the linkage allows the swing arm to be fully deployed under action of gravity, the spring, or both without any additional force being needed to be applied to the handle. To store the assembly, the user initially releases the locking linkage of the linkage arrangement and pivots the swing arm partway towards the stored position. The swing arm can then be released into the retracted position thereof to allow continued pivoting of the swing arm fully into the stored position of FIG. 21.

Figure 33:
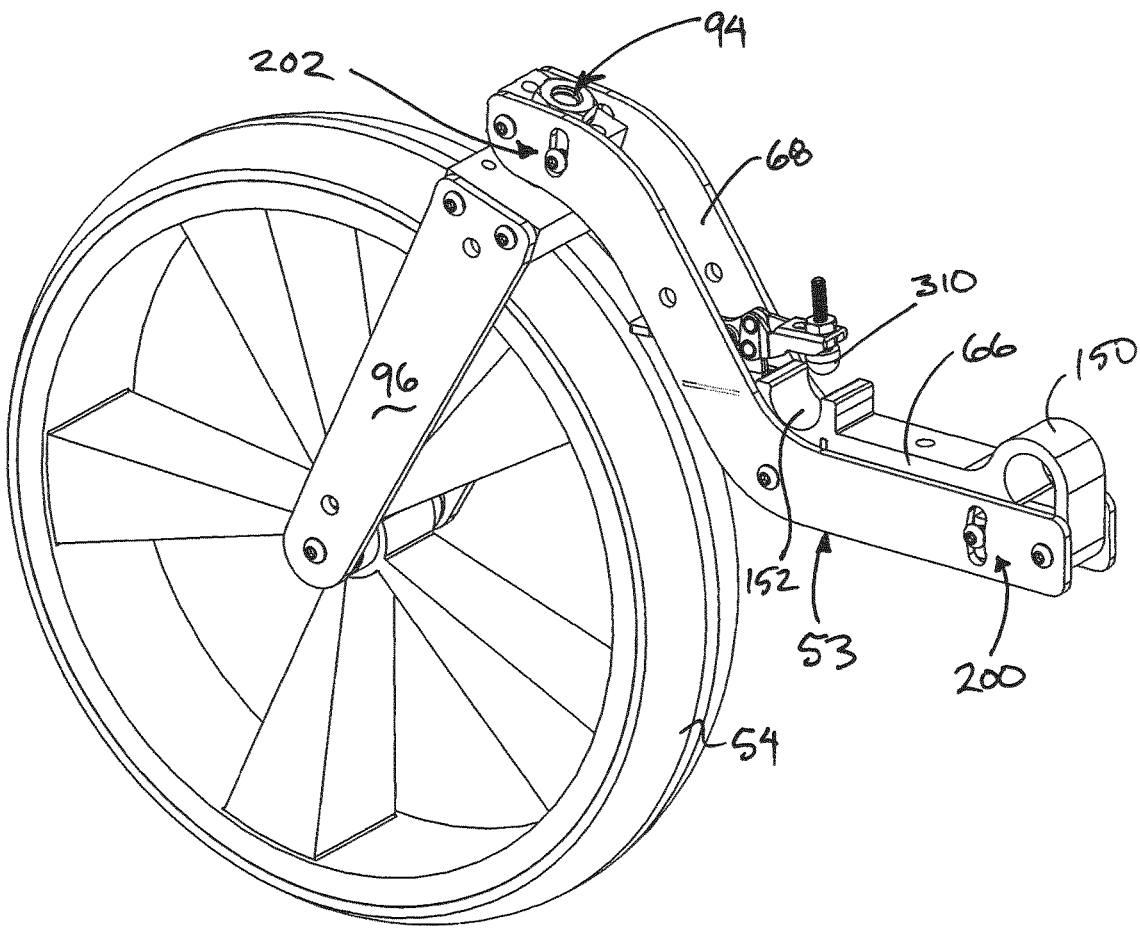
FIG. 33 is a perspective view of the auxiliary wheel assembly according to a further embodiment.
Figure 34:
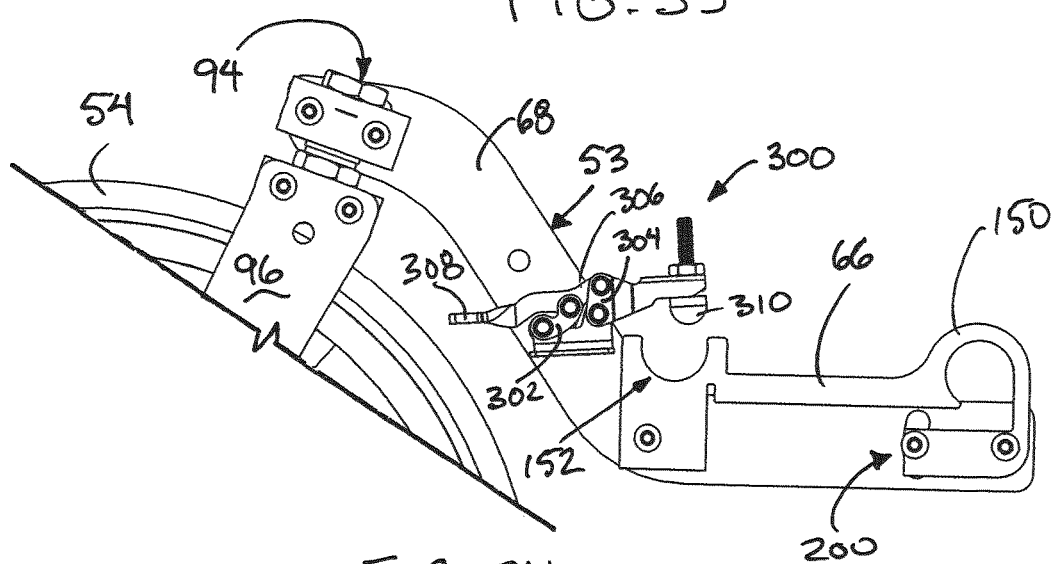
FIG. 34 is a side elevational view of the auxiliary wheel assembly according to the embodiment of FIG. 33 with a portion of the swing arm removed for illustrative purposes.

Turning now to the embodiment of FIG. 10 through 14 and the embodiment of FIGS. 33 and 34, in this instance the mounting arrangement again comprises a mounting bracket 150 arranged to be rotatably clamped about the rear bar 34 of the foot rest frame portion 28 upon which the inner end of the swing arm is fixedly mounted so that the pivoting movement of the mounting bracket 150 about the rear bar 34 defines the pivotal connection of the mounting arrangement that supports the linkage arrangement for pivotal movement relative to the chair frame. In the deployed position, the swing arm extends forwardly under the front bar 32 of the foot rest frame portion 28 and then bends upwardly and forwardly to the outer end of the swing arm. The auxiliary wheel 54 is supported on the outer end of the swing arm by the same swivel 94 and fork 96 described above with regard to the embodiment of FIGS. 6 through 8.

In this instance the engagement of the swing arm with the bottom of the front bar 32 of the foot rest frame portion 28 results in the front bar acting as a stop which limits further pivotal movement of the swing arm away from the stored position beyond the deployed position. The top of the swing arm at a location in alignment with the front bar 32 may include a cradle 152 formed to at least partly receive the front bar therein in the deployed position of the assembly. Optionally, the cradle may comprise a semicylindrical surface which receives approximately half of the circumference of the front bar therein in a manner that frictionally retains the front bar within the cradle by a force which exceeds the force of gravity acting on the auxiliary wheel and swing arm when the front end of the wheelchair is lifted to lift the auxiliary wheel off the ground. In this manner, the assembly is firmly held in the deployed position even as the front end of the wheeled apparatus is lifted slightly to deweight the auxiliary wheel. Alternatively to the cradle, a latch or toggle clamp or other arrangement placed on the swing arm forward of the front bar 32 can clamp the assembly to the wheeled apparatus.

In order to displace the assembly 10 into the stored position, the wheeled apparatus is tilted rearward by lifting of the front end of the chair frame followed by breaking the friction (if a friction fit is present) between the front bar 32 and the cradle 152 so that the auxiliary wheel remains engaged upon the ground. If the occupant continues to quickly lift the front end of the chair frame, the auxiliary wheel and swing arm will swing downwardly and rearwardly like a pendulum with sufficient momentum to cross the bottom of the pendulum arc so that the wheel axis of the auxiliary wheel 54 is then positioned rearward of the swing arm axis. Subsequently lowering of the front end of the wheeled apparatus 12 will result in continued upward and rearward pivoting of the swing arm under the seat of the wheeled apparatus so that the front wheels may engage the ground as shown in the stored position of FIG. 14. An additional latching or retaining structure may be provided below the seat of the wheeled apparatus to support the swing arm spaced above the ground in the stored position beneath the seat of the wheeled apparatus. For example, a semicircular surface could be mounted on the chair frame to receive and frictionally retain the width of a section the wheel therein to locate the swing arm in the stored position in one embodiment of a latching or retaining structure.

When it is desired to deploy the assembly 10, the user releases any latching structure so that the swing arm and/or auxiliary wheel 54 engage the ground below the seat of the wheeled apparatus. Quickly lifting the front end of the chair frame will cause a reverse pendulum motion in which the swing arm is initially swung downward and forward, then crosses over the bottom of the pendulum arc so that the wheel axis of the auxiliary wheel 54 is then positioned forwardly of the swing arm axis. Subsequent downward displacement of the front end of the chair frame then causes continued upward and forward motion of the auxiliary wheel relative to the chair frame while the auxiliary wheel rolls forwardly along the ground until the deployed position is reached where the front bar of the foot rest frame portion 28 bears weight on the top of the swing arm to force the front bar into the cradle 152 and thereby frictionally retain the swing arm in the deployed position. The assembly 10 in this embodiment differs from the previous embodiments primarily by the auxiliary wheel passing under the swing arm axis as it is displaced between the stored position in the deployed position.

In both embodiments of FIG. 10 and FIG. 33, the swing arm 53 is again provided with an inner arm portion 66, an outer arm portion 68 and a swivel 94, in which a first adjustable connection 200 as described elsewhere herein adjustably connects the inner arm portion 66 to the outer arm portion 68 for height and angle adjustment, while a second adjustable connection 202 as described elsewhere herein adjustably connects the outer arm portion 68 and the swivel 94 primarily for angle adjustment.

Turning now to FIGS. 33 and 34, in this instance the auxiliary wheel assembly 10 differs from the embodiment of FIGS. 10 through 14 in that the swing arm 53 is retained in the deployed position by an additional latching assembly 300 in place of or in addition to the friction fit of the cradle 152 described above. The latching assembly as illustrated comprises a four-bar linkage supported on the swing arm that includes a first link member 302 pivoted at a first axis on the swing arm 53 and a second link member 304 pivoted at a separate second axis on the swing arm 53. An additional actuating link 306 is pivotally coupled to the first link member 302 at a third axis and is pivotally connected to the second link member 304 at fourth axis spaced from the third axis. A handle portion 308 is integrally formed with the actuating link 306 to protrude outwardly beyond the third axis away from the fourth axis in a direction of the main section of the actuating link 306 that is connected between the third and fourth axes. A clamp body 310 is carried on the second link member 304 using a threaded connection such that a height of the clamp body relative to the link member can be adjusted in the latched configuration of the latching assembly 300. The clamp body 310 is positioned for alignment above the cradle 152 for engaging a top side of the front bar 32 of the foot rest assembly to retain the front bar within the cradle 152 in the latched configuration.

As illustrated, in the latched position, the third axis defining the pivotal connection between the actuating link 306 and the first link member 302 is positioned substantially in line between or rotated slightly over centre relative to a plane occupied by (i) the first axis about which the first link member pivots relative to the swing arm 53 and (ii) the fourth axis between the actuating link 306 and the second link member 304. In order to release the linkage assembly 300 from the latched position, the outer end of the handle portion 308 is pulled upwardly so that the third axis crosses through the plane of the first axis and the fourth axis whereby continued rotation towards a released position of the latching assembly 300 causes the clamp body 310 to be sufficiently displaced upwardly and forwardly such that it does not interfere with pivoting motion of the swing arm from the deployed position to the stored position. The motion of the swing arm from the deployed position to the stored position is again accomplished by doing a wheelie as described elsewhere herein. When deploying, once the swing arm has been displaced from the stored position to the deployed position, the latch is returned to the latching position by pressing downward on the handle portion 308 as the latch approaches the latched position to urge the third axis to align with or cross the plane of the first and fourth axes as described above such that the clamping force exerted on the clamp body acts on the latching assembly 300 in a direction to bias the actuating link 306 of the latching assembly to remain in the deployed position.

Turning now to FIG. 15, the assembly 10 according to the previous embodiment is shown supported on a different chair frame configuration. Rather than mounting the bracket 150 onto an existing frame portion of the chair frame, the chair frame in this instance may be modified to include a rear crossbar 160 and a front crossbar 162 mounted thereon to provide the function of the rear bar 34 and front bar 32 of the foot rest frame portion 28 so that the bracket 150 is instead mounted on the rear crossbar 160. Each of the crossbars 160 and 162 are mounted at opposing ends using suitable brackets that fix onto the two side frame portions 18 of the chair frame respectively. The front crossbar 162 is located at the front end of the chair frame immediately rearward of the individual foot platforms 46 while the rear crossbar 160 is mounted in proximity to the front end of the chair frame at a location spaced slightly rearward of the front crossbar 162. The mounting bracket 150 at the inner end of the swing arm 53 in this instance is rotatably clamped about the rear crossbar in lateral alignment with a gap between the 2 foot platforms 46. Displacement of the assembly between the deployed and stored positions in this instance is substantially identical to the previous embodiment shown in FIGS. 10 through 14, while the cradle 152 receive the front crossbar 162 therein to frictionally retain the assembly in the deployed position.

Figure 22:
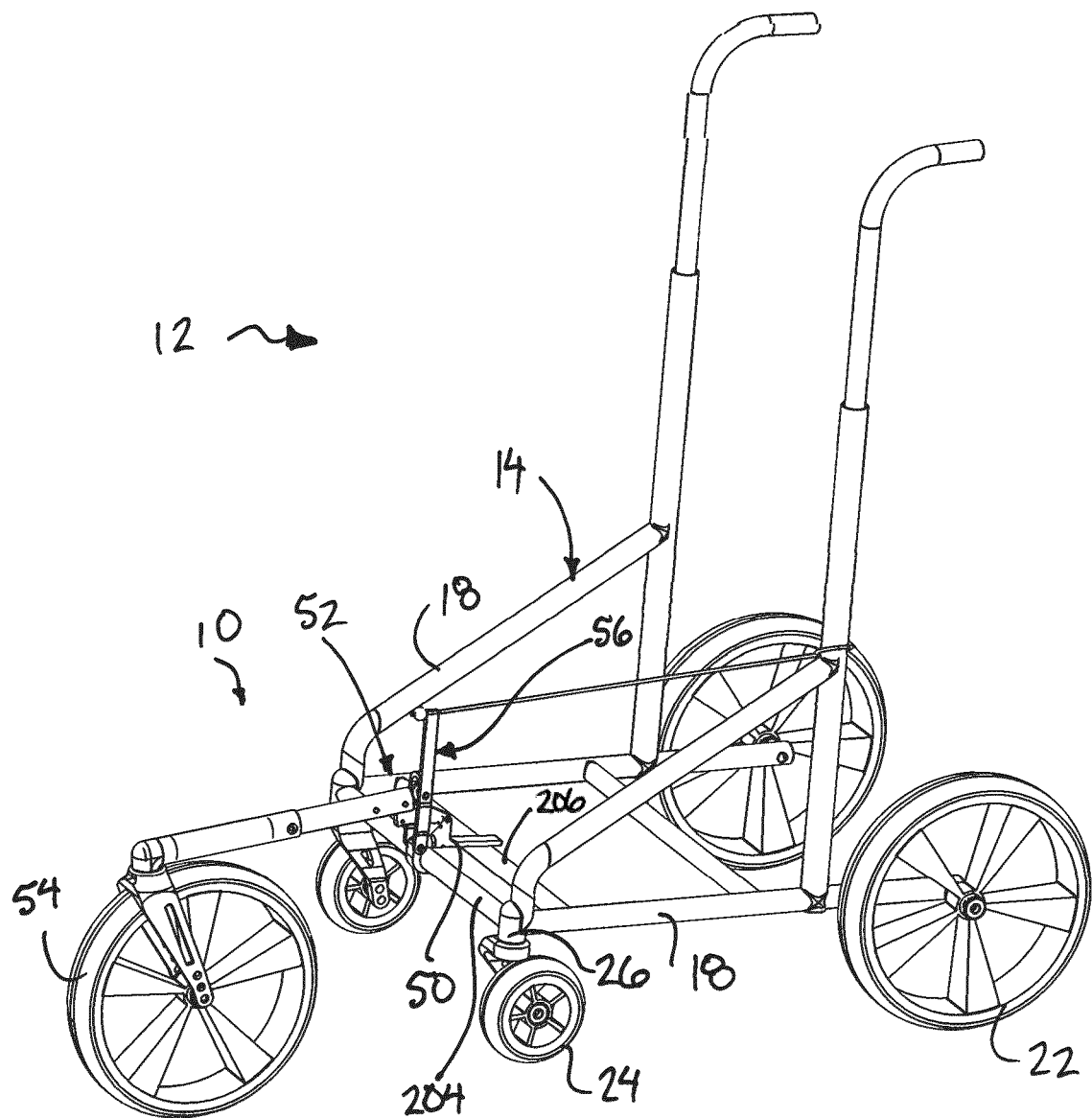
FIG. 22 is a perspective view of the auxiliary wheel assembly on the wheeled apparatus in the deployed position according to yet another embodiment of the present invention.
Figure 23:
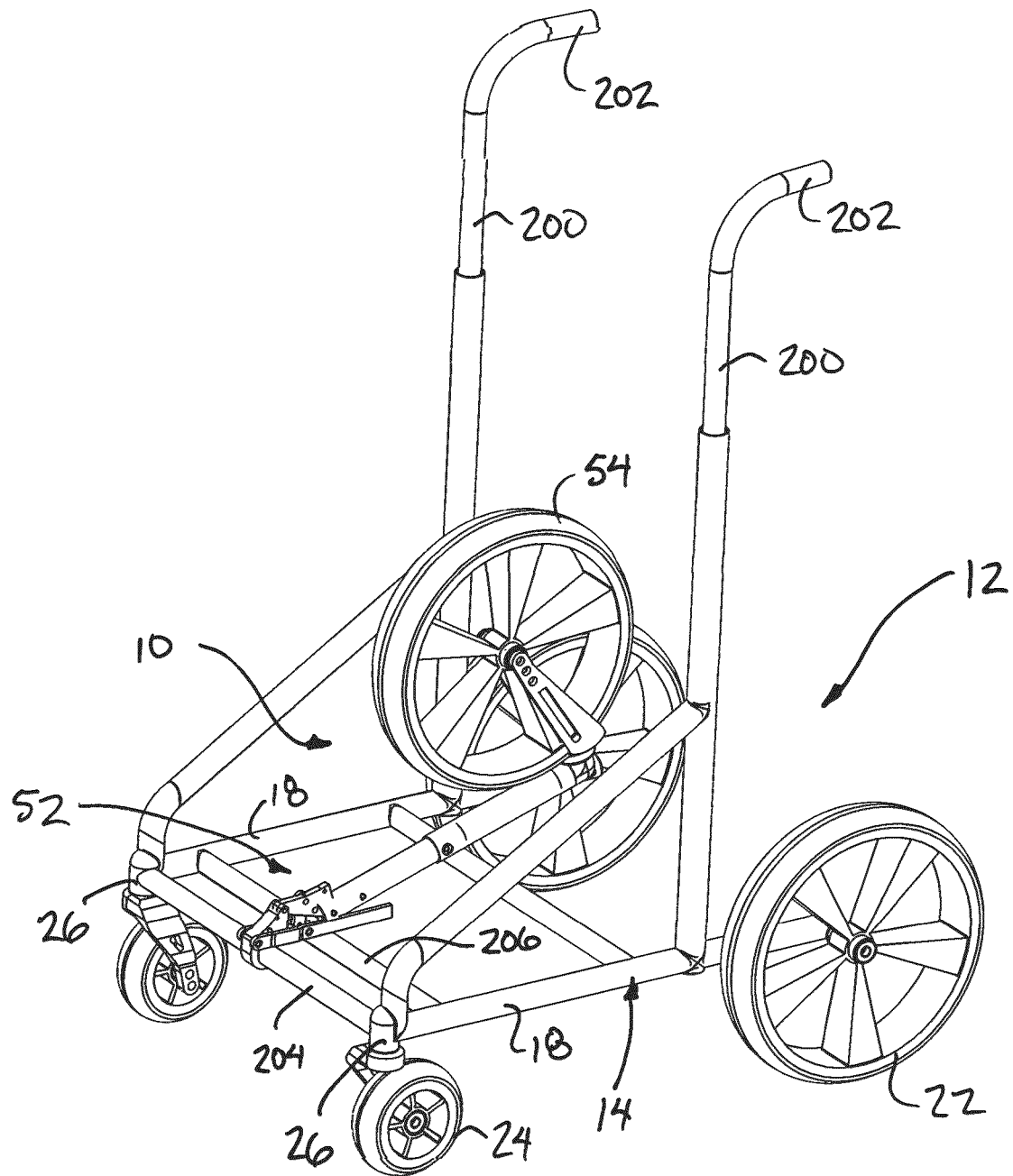
FIG. 23 is a perspective view of the auxiliary wheel assembly on the wheeled apparatus in the stored position according to the embodiment of FIG. 22.

In the embodiment of FIGS. 22 and 23 the wheeled apparatus 12 comprises a rollator having a main frame 14 including two side frame portions 18 at laterally opposing sides to extend longitudinally between front and rear ends of the frame. Each side frame 18 supports a respective upright post 200 at the rear of the main frame 14 having a rearward projecting handle member 202 at the top end thereof that is arranged to be gripped in a hand of a user. The rollator provides support to a person gripping both handle members 202 as they walk along a supporting surface such as the ground while leaning onto the rollator. The post 200 and the handle member 202 on the post may be adjustable in height relative to the main frame 14.

The main frame 14 is supported for rolling movement along the ground on a set of primary wheels of the apparatus 12 when the auxiliary wheel assembly 10 is stored. The primary wheels include two rear wheels 22 rotatably supported at laterally opposing sides of the main frame in proximity to the rear end thereof, and two front wheels 24 rotatably supported at laterally opposing sides of the main frame in proximity to the front end thereof. The rear wheels may be larger in diameter than the front wheels and are supported on the side frame portions 18 of the main frame. The front wheels typically comprise castor wheels supported by respective swivels 26 for pivotal movement relative to the main frame about respective vertical steering axes.

The assembly 10 in the embodiment of FIGS. 22 and 23 is substantially identical to the embodiment of FIGS. 20 and 21, but any other embodiment of the assembly 10 could also be adapted to be mounted on the rollator. In the illustrated embodiment, the mounting frame 50 of the assembly 10 is releasably mounted in fixed relation on a front crossbar 204 and a rear crossbar 206 spanning between the side frame portions 18 at the front end of the main frame 14.

Turning now to FIGS. 24 through 32, two additional embodiments will now be described which each make use of a locking linkage 56 that functions substantially identically to the embodiments of FIG. 1 to 8 for operating a linkage assembly comprised primarily of a swing arm 53 to displace the auxiliary wheel 54 between the deployed and stored positions.

In each instance, the auxiliary wheel assembly again is intended to mount on a footrest frame portion 28 of the wheeled apparatus 12. To accomplish this, the mounting arrangement 50 again provides a mounting frame 58 having a hook 62 at the forward end for being hooked about the front surface of the front bar 32 of the wheeled apparatus 12 and a clamp member 64 at the rear end which is intended to be releasably clamped about the rear of the rear bar 34 of the wheeled apparatus 12. The mounting arrangement 50 also further defines a pivotal connection thereon forming the pivot at the inner end of a swing arm 53 which again primarily defines the linkage arrangement 52 that supports the auxiliary wheel 54 for movement relative to the wheeled apparatus 12 between the deployed and stored positions. The locking linkage 56 is again provided for securing the swing arm in the deployed position, generally in the form of a four bar linkage comprised of the mounting frame 58, the swing arm 53, a first intermediate link 70 pivotally mounted on the mounting frame 58, and a second intermediate link 72 pivotally connected between the first intermediate link 70 and the swing arm 53 similarly to the embodiments of FIGS. 1 through 8.

Some form of stop similar in function to the stop 83 of prior embodiments is also typically provided against which the swing arm or a portion of the locking linkage 56 is engaged in the deployed position to prevent further displacement of the linkage away from the stored position beyond the deployed position. In the embodiment of FIGS. 24 to 28, a pivot shaft or pivot bosses that pivotally connects the release lever 224 to the inner side plates 206 as described below provides a stop against which a lower leg 222 of the second intermediate link 72 abuts in the fully deployed position. In the embodiment of FIGS. 29 to 32, inner boundary surfaces of the passage 230 in the inner arm portion 66 of the swing arm 53 provide an abutment surface against which the second intermediate link 72 abuts in the fully deployed position.

Figure 24:
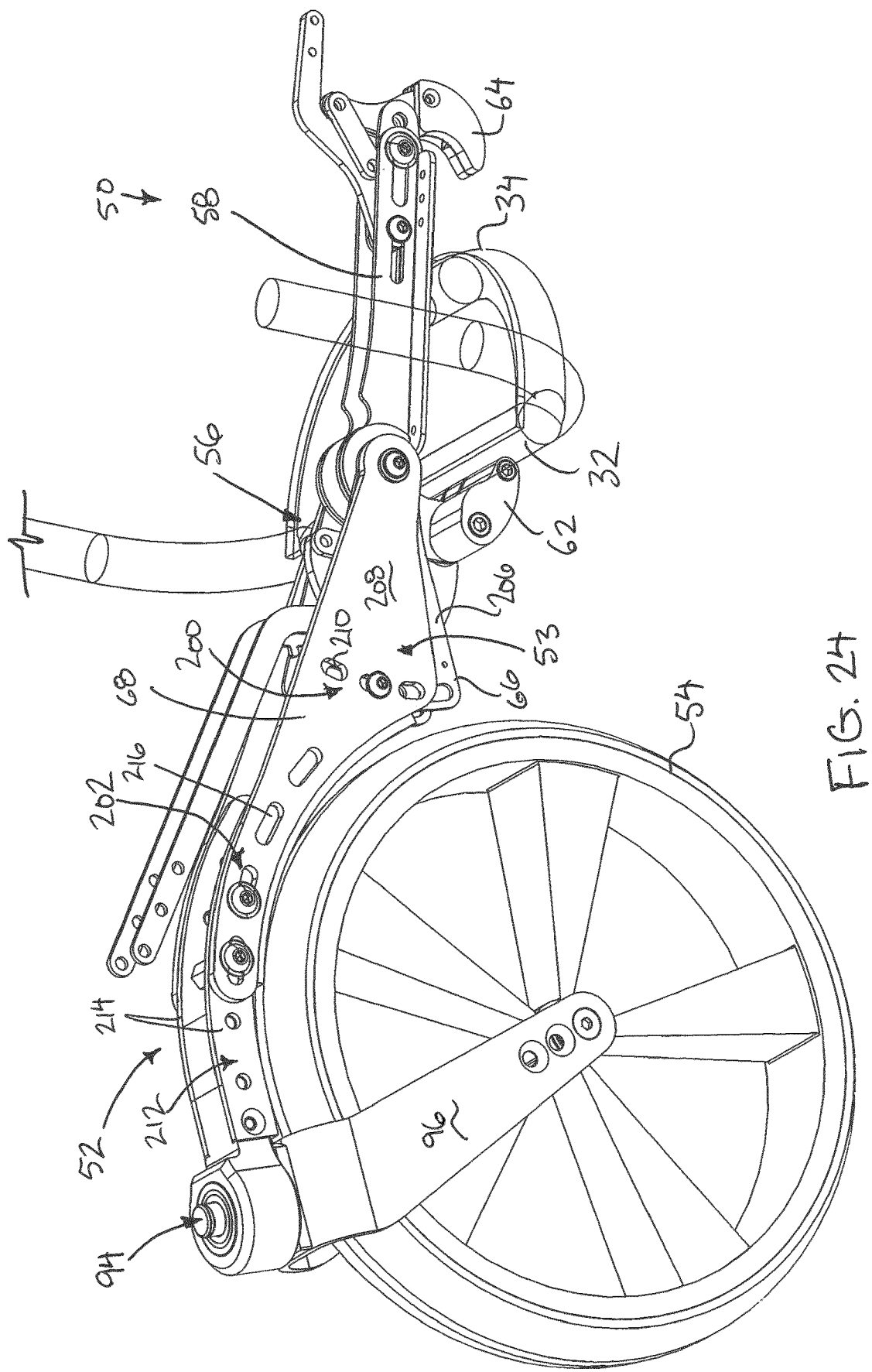
FIG. 24 is a perspective view of a further embodiment of the auxiliary wheel assembly shown in a deployed position.
Figure 25:
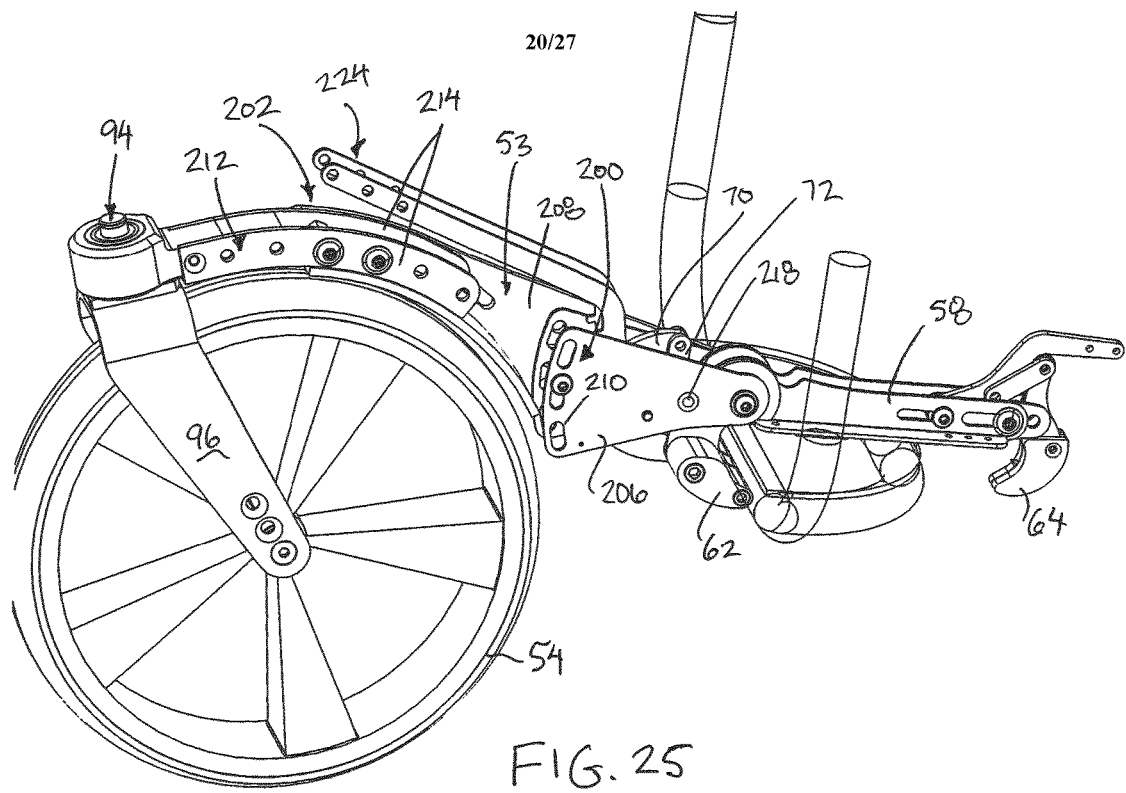
FIGS. 25 to 27 are perspective views of the auxiliary wheel assembly according to the embodiment of FIG. 24 with some parts removed for illustrative purposes.
Figure 26:
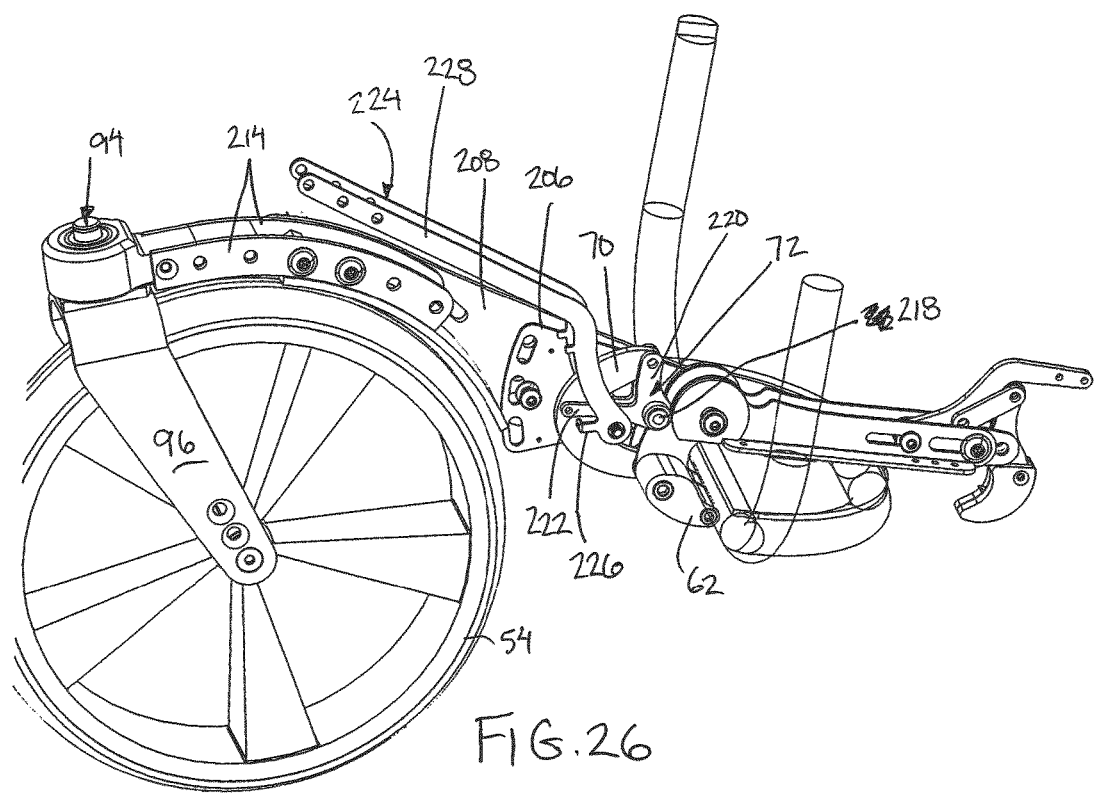
Figure 27:
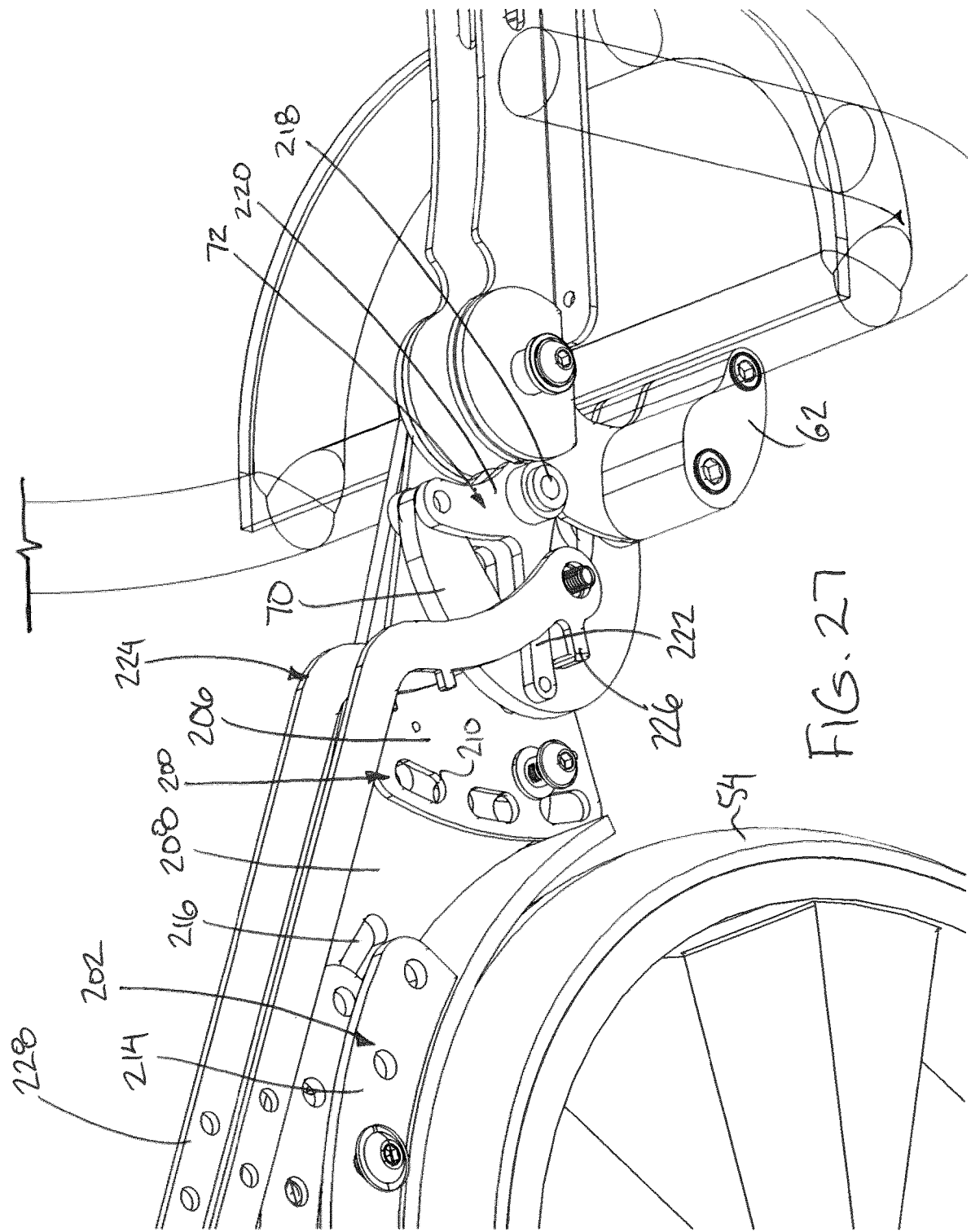
Figure 28:
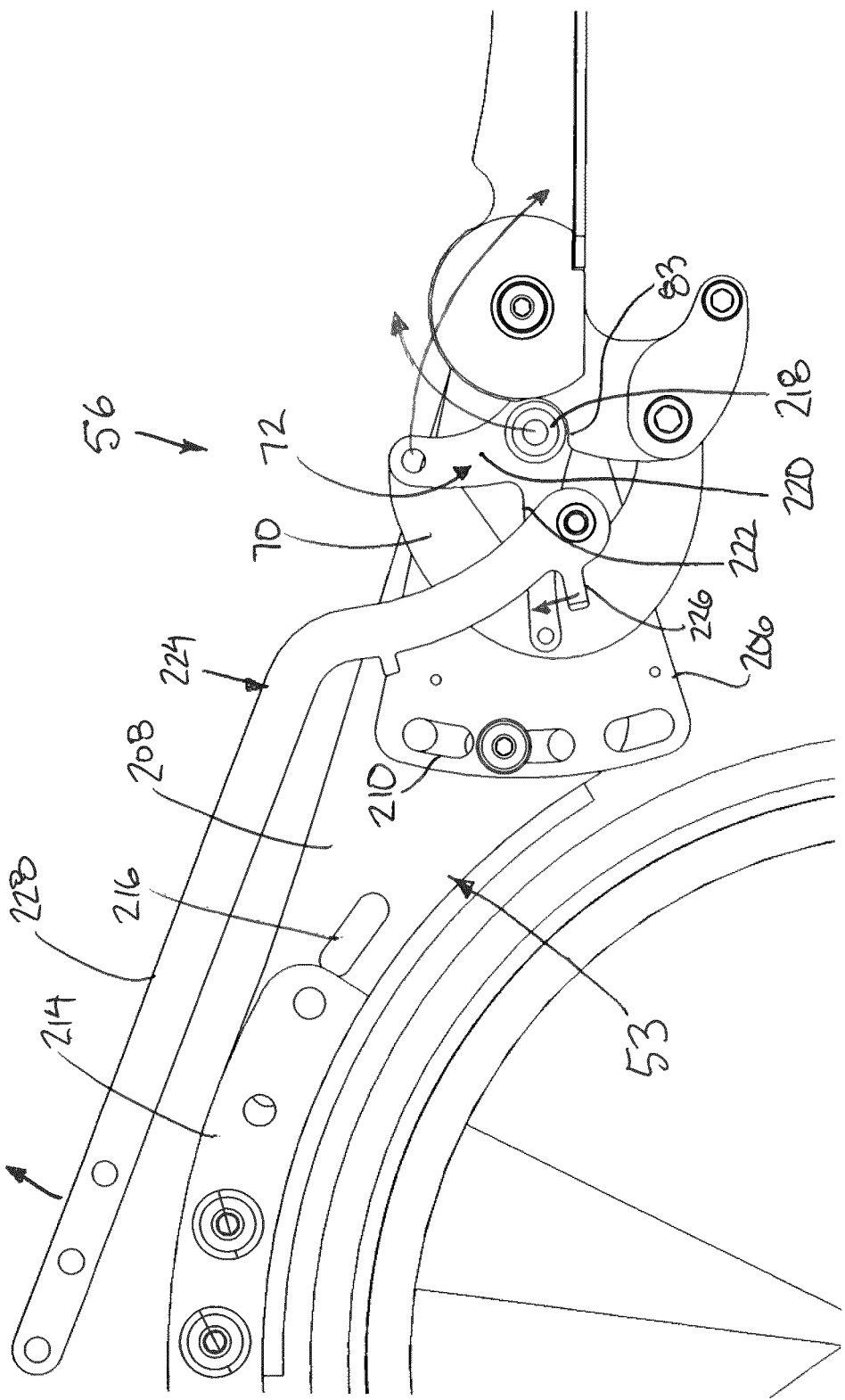
FIG. 28 is a side elevational view of the auxiliary wheel assembly according to the embodiment of FIG. 24 illustrating a direction of movement towards the stored position.

Also similarly to the embodiment of FIG. 8, the swing arm 53 in both FIG. 24 and FIG. 25 again comprises an inner arm portion 66 forming part of the four bar linkage of the locking linkage 56 and an outer arm portion 68 adjustably mounted on the inner arm portion to protrude away from the swing arm axis beyond the inner arm portion and in turn support the swivel 94 at the outer end thereof. The swivel 94 comprises a swivel frame fixed on the outer arm portion 68 to support a suitable bearing therein which in turn supports an upright shaft rotatably relative to the swivel frame to define an upright swivel axis of the auxiliary wheel 54. A wheel frame in the form of a fork 96 is connected to the shaft of the swivel 94 such that the fork 96 rotatably supports the auxiliary wheel 54 thereon for rolling motion about a wheel axis at the bottom end of the fork.

Figure 29:
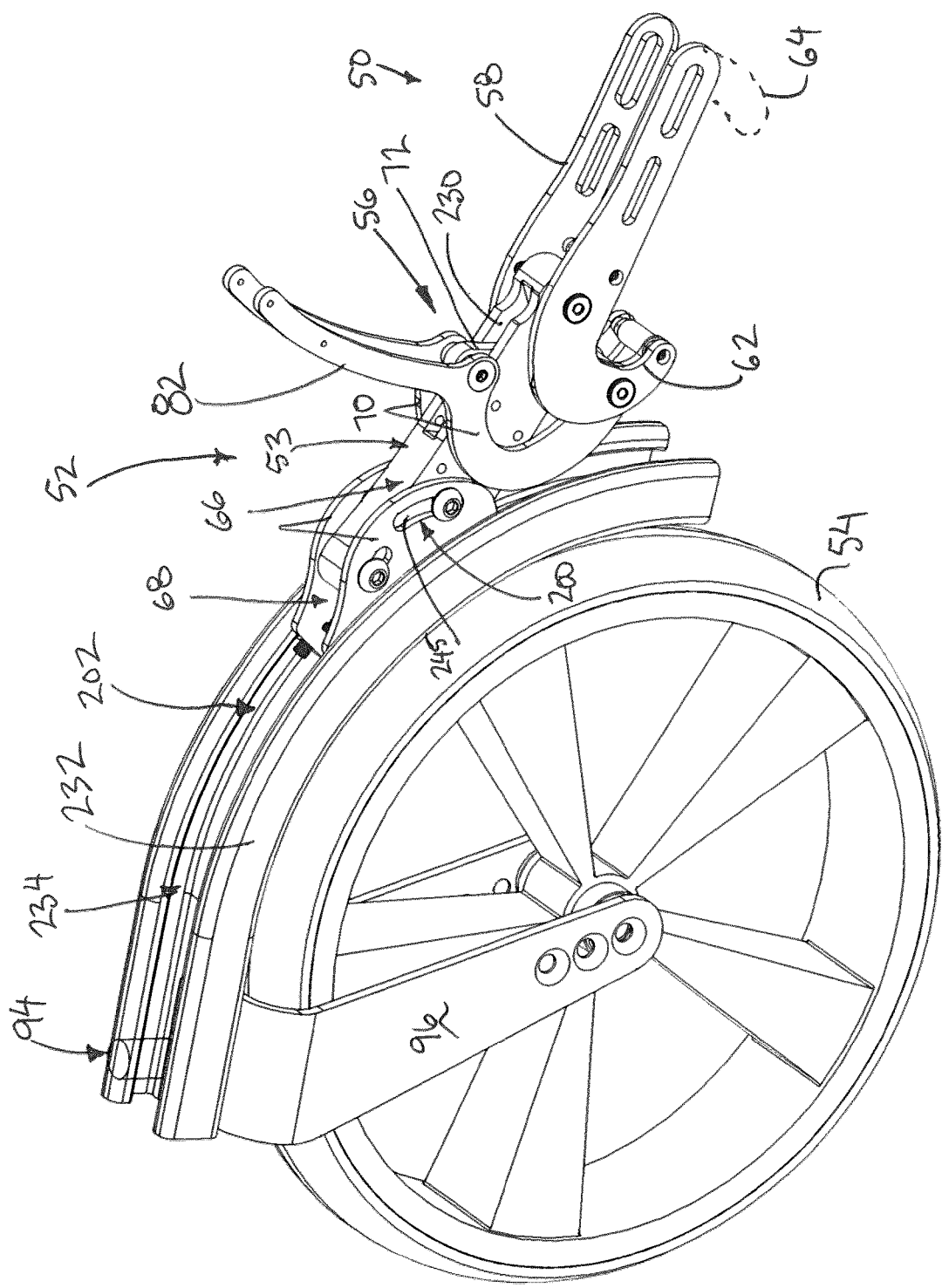
FIG. 29 is a perspective view of a further embodiment of the auxiliary wheel assembly shown in a deployed position.

With regard to the embodiments of FIGS. 24 and 29, the swivel 94 is intended to be mounted in an orientation resulting in the upright steering axis being substantially vertical while the fork 96 extends downwardly and rearwardly to support the wheel axle at the bottom end thereof at a location spaced rearwardly of the vertical steering axis. In this manner, the auxiliary wheel is self-steering towards a forward rolling orientation when the wheeled apparatus is displaced forwardly. Increasing the rearward offset of the wheel axle relative to the upright steering axis increases the stability of the auxiliary wheel to maintain a forward rolling orientation. Furthermore, the substantially vertical steering axis maintains a relatively stable height of the raised front end of the wheelchair when the auxiliary wheel device is deployed, regardless of the orientation of the fork 96 and wheel 54 with respect to the forward rolling direction. Accordingly, when moving forward or backward or in between, the front end does not bob up and down similarly to the advantages of the substantially vertical steering axis of the embodiment of FIGS. 20 to 23.

In order to maintain an ability to control the height of the auxiliary wheel 54 relative to the mounting frame 58 in the deployed position (and thus setting the height of the raised casters 24 of the wheelchair 12 when the auxiliary wheel invention is in the fully deployed position), the embodiments of FIG. 24 and FIG. 29 are provided with a first adjustable connection 200 between the inner arm portion 66 and the outer arm portion 68 and a second adjustable connection 202 between the outer arm portion and the swivel frame of the swivel 94 that function similarly to the corresponding adjustable connections 200 and 202 in the embodiment of FIG. 8. More particularly, the first adjustable connection comprises a combination of an upright slot and transverse fasteners connected through the upright slot between the inner and outer arm portions to allow some adjustment between the inner and outer arm portions by movement of the fastener within the slot. The first adjustable connection defines a primary adjustment of the auxiliary wheel 54 resulting in the outer arm portion being pivoted relative to the inner arm portion towards the inner end of the outer arm portion 68 while the outer end of the outer arm portion is displaced primarily upward and downward by the adjustment. This in turn functions to primarily adjust the height of the auxiliary wheel 54 relative to the mounting frame 58 when in the deployed position. Due to the pivoting type movement of the outer arm portion 68 when it is adjusted, adjusting the height will also cause a corresponding adjustment to the angular orientation of the upright steering axis of the swivel 94. The fastener can be secured at different positions along the slot of the first adjustable connection 200 to define a plurality of different mounting configurations between the inner and outer arm portions. Each mounting configuration corresponds to a different height of the auxiliary wheel while simultaneously corresponding to a different angular orientation of the upright steering axis relative to the mounting frame 58 so that the height and orientation of the steering axis are adjusted together in tandem when performing adjustments using the first adjustable connection 200.

The second adjustable connection 202 also may comprise a combination of an elongated slot and transverse fasteners connected through the slot between the outer arm portion and the swivel frame to allow some adjustment therebetween by movement of the fasteners within the slots. The second adjustable connection 202 defines a secondary adjustment of the auxiliary wheel that is primarily directed towards changing the angular orientation of the upright steering axis of the swivel 94 relative to the mounting frame 58 in the deployed position with minimal or substantially no change to the height of the auxiliary wheel relative to the mounting frame 58 in the deployed position. This is accomplished by supporting the swivel frame of the swivel 94 for a generally pivotal type movement between the different mounting configurations of the second adjustable connection 202 about an approximate pivot axis that is either substantially concentric with the wheel axis, adjacent to the wheel axis, or adjacent the upright steering axis of the swivel 94. In this manner minimal or substantially no change in height occurs when the orientation of the steering axis is changed relative to the mounting frame 58 in the deployed position by use of the second adjustable connection 202.

Turning now more specifically to the embodiment of FIG. 8, the first adjustable connection in this instance comprises a first fastener coupled between the inner and outer arm portions 66 and 68 defining a pivot shaft about which the outer arm pivots relative to the inner arm portion, and a fastener slot which is elongate and arcuate in shape about the first fastener while being near vertical in orientation and horizontally spaced from the first fastener. A second fastener is fastened through the slot and as the fastener is repositioned along the slot, the outer arm portion is adjusted by pivotal motion relative to the inner arm portion so that the outer end of the outer arm portion varies in height. Securing the second fastener within the arcuate slot fixes and secures the outer arm portion to be immovable relative to the inner arm portion once a selected orientation and corresponding height of the auxiliary wheel 54 relative to the mounting frame 58 has been selected.

The second adjustable connection in the embodiment of FIG. 8 similarly comprises a first fastener connected between the outer arm portion and the frame of the swivel 94 to define an approximate pivot axis about which the swivel frame can be adjusted relative to the outer arm portion and an elongate slot that receives a second fastener therein in which the slot is also near vertical in orientation and horizontally spaced from the first fastener. Displacement of the second fastener along the slot causes the wheel axis at the bottom end of the wheel frame to be displaced along an arcuate path relative to the first fastener of the second adjustable connection 202 in which the arcuate path is primarily horizontal in orientation so that the angular orientation of the upright steering axis can be adjusted with minimal change in height or elevation of the auxiliary wheel relative to the mounting frame in the deployed position.

Turning now to the embodiment of FIG. 24, in this instance the inner arm portion comprises two inner side plates 206 pivotally supported at an inner end on the mounting frame at the swing axis. The two inner side plates 206 are laterally spaced apart for receiving components of the locking linkage 56 therebetween. The outer arm portion 68 in this instance comprises two outer side plates 208 also pivotally supported at respective inner ends on the same pivot shaft as the inner side plates 206 at the swing axis so that the outer side plates extend alongside the inner side plates respectively at respective outer sides thereof while extending radially outward from the swing axis beyond the end of the inner side plates 206. Elongate slots 210 are provided in both the inner side plates and the outer side plates at a location spaced radially from the swing axis while being oriented generally in a circumferential direction relative to the swing axis. Fasteners can be secured through the slots 210 to selectively fix the outer side plates 208 relative to the inner side plates 206 at any selected one of a plurality of different mounting configurations. The fasteners received within the slots 210 defines the first adjustable connection 200 in this instance.

The portion of the outer side plates 208 extending outward beyond the inner side plates 206 are shaped to follow a generally arcuate path that extends in a circumferential direction approximately about the wheel axis of the auxiliary wheel 54. The swivel frame 212 of the swivel 94 in this instance comprises two swivel plates 214 which are intended to mount along corresponding curved portions of the outer side plates 208 of the outer arm portion in a mounted position. The swivel plates thus also follow a substantially or approximately arcuate path extending in a circumferential direction substantially or approximately about the wheel axis of the auxiliary wheel 54. A plurality of arcuate and cooperating slots 216 are provided in both the swivel plates and the outer curved portions of the outer side plates 208 to receive fasteners through the cooperating slots to define the second adjustable connection 202. By removing or loosening the fasteners, the swivel plates 214 can be adjusted relative to the outer side plates 208 to vary the amount of overlap in the circumferential direction corresponding to the different mounting configurations of the second adjustable connection. Use of fasteners allows the second adjustable connection to be secured at any selected mounting configuration resulting in the swivel frame 212 being fixed and immovable relative to the outer side plates of the outer arm portion respectively. Due to the adjustment of the swivel frame 212 being in a circumferential direction relative to the outer arm portion 68, the relative adjustment between the swivel frame and the outer arm portion is approximately a pivotal connection about a pivot axis lying at or near the wheel axis of the auxiliary wheel 54 so that adjustment between the different mounting configurations of the second adjustable connection 202 results in substantially no change in height of the wheel axis relative to the mounting frame 58 in the deployed position while primarily adjusting the angular orientation of the upright steering axis of the swivel 94 relative to the mounting frame in the deployed position between the different mounting configurations respectively.

The locking linkage in the embodiment of FIG. 24 again includes a first intermediate link 70 pivoted on the mounting frame at a location below and forward of the swing arm axis and a second intermediate link 72 pivoted at the opposing end of the first intermediate link 70 at a link axis and pivoted at a second axis on the swing arm at a location spaced forward of the swing axis. More particularly, the first intermediate link 70 is a laterally centred singular plate which is generally C shaped in profile from a first pivot at the bottom end in the deployed position on the mounting frame while extending upwardly and rearwardly to the opposing pivot at the top end which is initially upwardly and forwardly of the swing axis in the deployed position. The curved shape of the first link allows the first link 70 to be curved about a pivot shaft 218 of the second intermediate link 72 and the pivotal connection of the swing arm at the swing axis without interference when the first link is pivoted rearwardly towards the stored position as shown by the rearward and downward directional arrow in FIG. 28.

The second intermediate link 72 in this instance comprises two parallel link members positioned at laterally opposing sides of the plate forming the first link 70. Each second link member includes a first leg 220 extending from the pivot shaft 218 upwardly in the deployed position between the inner side plates 206 of the inner arm portion to an opposing end that is pivoted at the top end of the first link 70 at the link axis. The pivot shaft 218 is mounted at opposing ends on the two inner side plates 206 of the inner arm portion of the swing arm in this instance.

The second intermediate link 72 further includes a second leg 222 that initially extends forwardly from the bottom end of the first leg in the deployed position to assume the function of the release handle 82 in previous embodiments. Upward force at the forward end of the second leg 222 in the deployed position urges the top end of the second link and corresponding pivotal connection to the top end of the first link 70 rearward towards the stored position according to the directional arrow of FIG. 28 referenced above. To provide a mechanical advantage acting on the second leg 222, a release lever 224 is pivotally supported on a respective pivot shaft coupled between the inner side plates 206 of the inner arm portion of the swing arm at a location below the second legs 222 of the second intermediate link 72 in the deployed position.

The release lever includes a first arm 226 protruding forward below the second leg 222 with a bent forward end that is an interference with the second leg 222 of the second link when the first arm is pivoted upwardly and forwardly towards release. The release lever 224 further includes a second arm 228 which is much greater in length than any of the links of the linkage and which extends generally upwardly and forwardly from the pivotal connection of the release lever 224. Displacing the release lever upwardly and then rearwardly causes the first arm 226 of the release lever to engage below the second leg 222 of the second link to urge the second link upward which in turn urges the entirety of the locking linkage to be released from the deployed position towards the stored position thereof. Sufficient clearance is provided about the release lever so that from the engaged position of the first arm 226 below the second leg 222 of the first link, the first arm can be pivoted downwardly and the corresponding second arm can be pivoted forwardly and downwardly to be positioned in close proximity alongside the swing arm in a non-protruding manner in an out of use position. From the out of use position, the second arm of the release lever can be initially pivoted upward and rearward away from the swing arm through a first range of motion before contact of the first arm 226 with the second leg 222 of the second link to allow more clearance for a user to grasp their hand fully about the elongate handle formed by the second arm 228 before any substantial force is required to be applied to urge the first arm 226 of the release lever against the second leg 222 of the second link for releasing the linkage.

Due to the requirement of the pivot shaft 218 at the base of the second link to pass through a plane occupied by the link axis between the first and second links and the axis of the first link 70 on the mounting frame as the linkage is released from the deployed position towards the stored position, there is an initial lengthening of the linkage required that acts against the bias of weight on the auxiliary wheel biasing the linkage to remain in the deployed position such that a relatively large force is required to release the linkage from the over-centre deployed position. The mechanical advantage provided by the configuration of the release lever 224 minimizes the pulling force required by an occupant of the wheelchair to break the linkage free of the deployed position.

In addition to the above described pulling force an occupant needs to exert to urge the release of the deployed auxiliary wheel towards the stored position, another configuration of release lever 224, along with its associated pivot axis, can be arranged such that the occupant needs to exert a pushing force onto release lever 224 to urge the release of the deployed auxiliary wheel towards the stored position (not shown). This arrangement would generally be embodied such that leg 226 would extend in the opposite direction (i.e. rearward) from that shown in FIG. 28. And the pivot axis of 224 would be somewhat further towards a more forward position along the two inner side plates 206. In this configuration, a perceived advantage of pulling compared to pushing is at the expense of the release lever 224 not being able to be in a non-protruding manner in an out of use position.

Turning now to the embodiment of FIG. 29, in this instance the inner arm portion comprises a singular body pivoted at an inner end on the mounting frame and locating a through passage 230 therein which is suitably sized to receive the second intermediate link 72 therein with sufficient clearance about the second link to allow non-interfering movement of the second link 72 relative to the inner arm portion as the linkage is displaced from the deployed position to the stored position.

In this instance, the swivel frame of the swivel 94 comprises an elongated channel 232 which extends in a circumferential direction about the auxiliary wheel 54 through a substantial portion of the circumference of the wheel so that the channel 232 generally provides the function of a fender extending about an upper and rearward portion of the auxiliary wheel in use. The channel 232 has a profile including a base 234 at the inner side closest to the wheel, two side flanges 236 extending upward from opposing sides of the base 234, and two top flanges 238 which extend inwardly and hook downwardly towards the base at the free end thereof to maintain an open space between the two top flanges at the outer side of the channel.

The outer arm portion 68 in this instance is supported for sliding movement within the interior of the channel 232 of the swivel frame to define a track along which the outer arm portion 68 can be slidably displaced relative to the swivel frame in a circumferential direction about the wheel axis of the auxiliary wheel 54. More particularly, the outer arm portion 68 in this instance comprises two separate side portions 240 which each have a lower body portion that is hooked under a respective one of the top flanges 238 of the channel 232 while the side portions 240 are maintained laterally spaced apart from one another by connection to the outer end of the inner arm portion 66 received therebetween in the mounted position. The shape of the lower body portions of the two side portions 240 of the outer arm portion 68 is mated to the shape of the track defined within the arcuate channel 232 of the swivel frame, which allows relative sliding in the circumferential direction to effectively define the second adjustable connection 202 of the auxiliary wheel assembly in this instance. The relative motion in the circumferential direction results in the upright steering axis of the swivel frame being adjusted in angular orientation relative to the mounting frame 58 in the deployed position between the different mounting configurations thereof with minimal or no change in elevation of the auxiliary wheel due to the relative motion approximating a pivotal connection about an axis substantially coincident with the wheel axis similarly to the previous embodiment.

Figure 30:
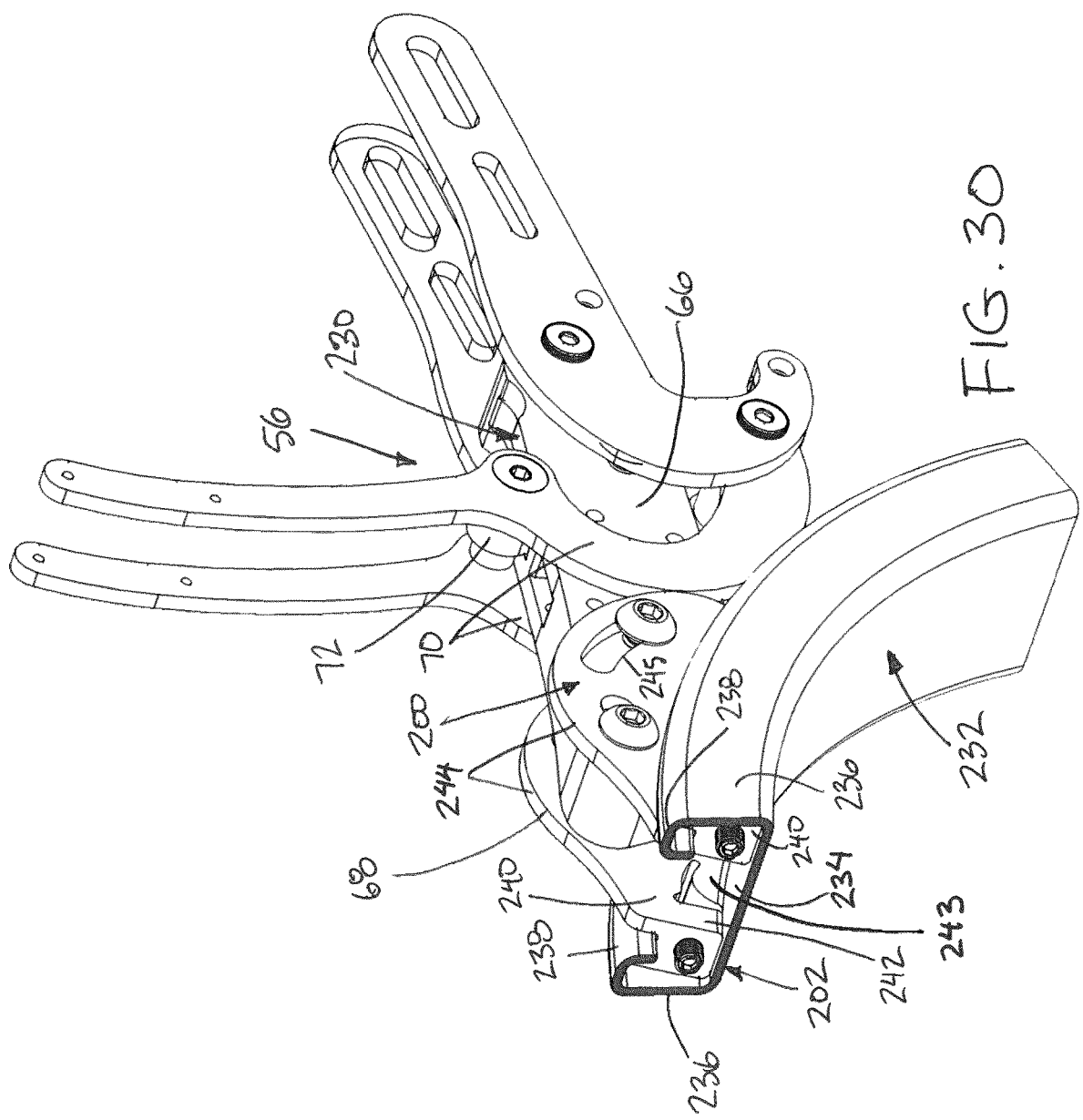
FIG. 30 is a partly sectional view of the auxiliary wheel assembly according to the embodiment of FIG. 29.
Figure 31:
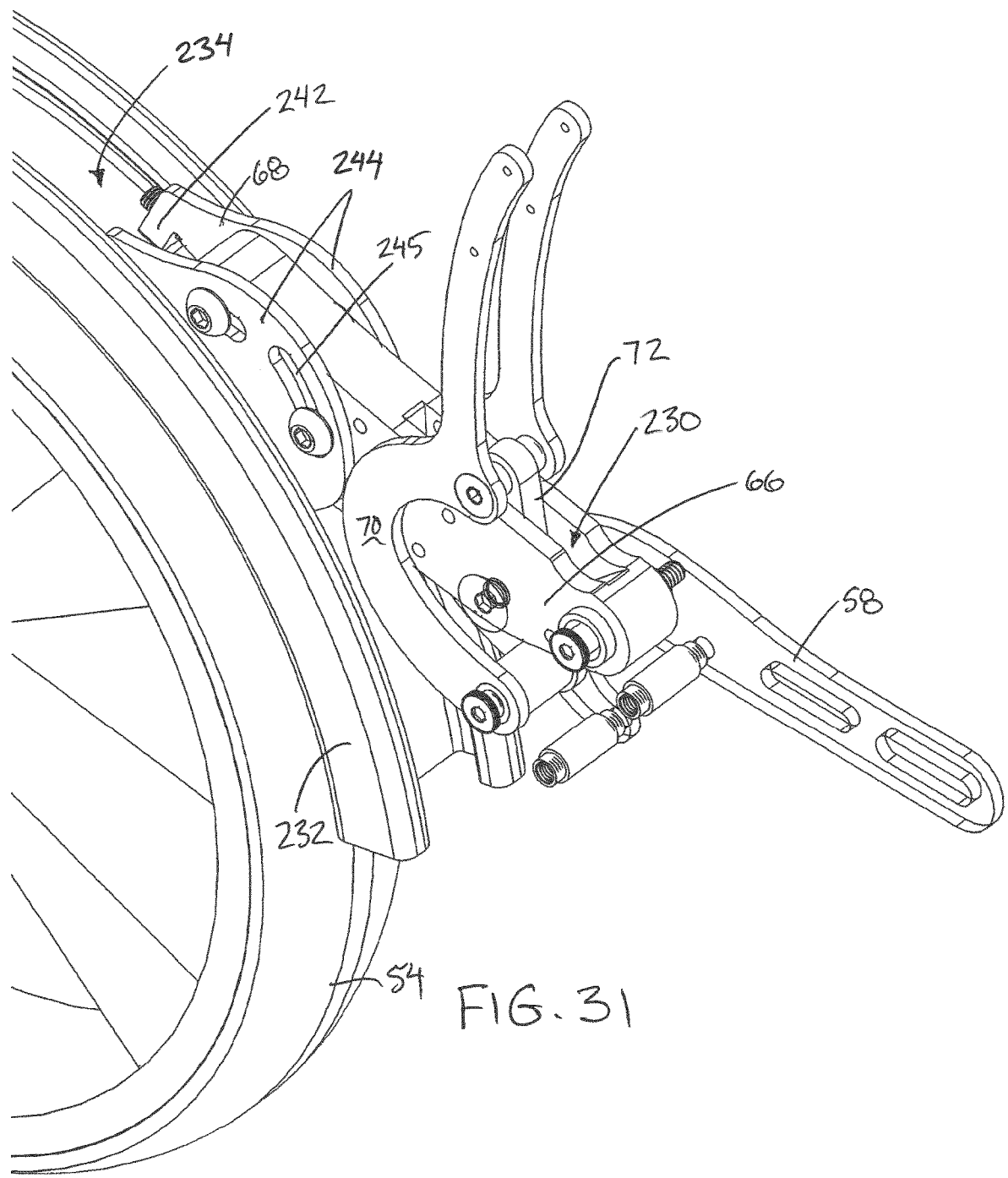
FIG. 31 is a perspective view of the auxiliary wheel assembly according to the embodiment of FIG. 29 with some parts removed for illustrative purposes.
Figure 32:
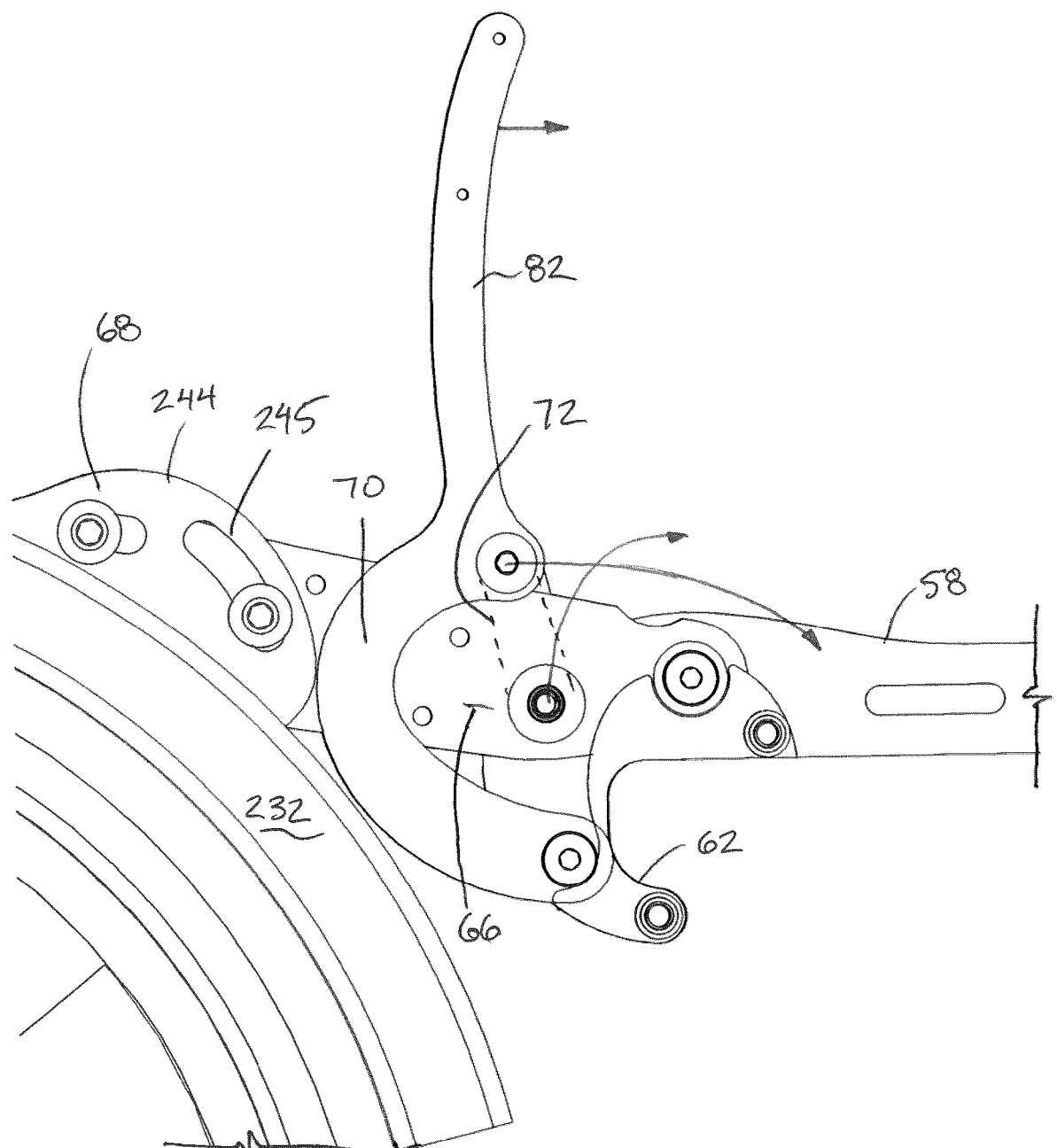
FIG. 32 is a side elevational view of the auxiliary wheel assembly according to the embodiment of FIG. 29 illustrating a direction of movement towards the stored position.

The position of the outer arm portion along the track of the swivel frame can be selected and the selected position can be maintained so that the outer arm portion 68 is fixed relative to the swivel frame by the configuration of the opposing ends of the lower body portion of each side portion 240. As shown in FIG. 30, slots are formed in the bottom of the lower body portion adjacent each of the circumferentially opposed ends thereof resulting in an end portion 242 that is spaced from the remainder of the body portion. The remainder of the body portion includes a lobe portion 243 that is adjacent the inner boundary of the slot and possesses a peninsula geometry so as to be deformable relative to the remainder of the body of the outer arm portion 68. A suitable fastener is threaded into the end portion 242 for abutment with the lobe portion 243 of the main body portion when spanning across the slot. Adjusting the threaded connection between the fastener and the end portion 242 causes the fastener to be abutted by varying degrees against the lobe portion 243 which in turn causes the lobe portion 243 and/or the end portion 242 to be flexed and distorted in orientation relative to the remainder of the body portion to move the deformable portions into an interference fitting position with the surrounding boundaries of the arcuate channel 232. When performed at the four corners of the outer arm portion 68, a strong frictional fit is created between the outer arm portion 68 and the surrounding channel of the swivel frame to selectively fix the outer arm portion immovably at the selected mounting configuration of the second adjustable connection.

To provide a first adjustable connection 200, the outer arm portion 68 in this instance further comprises an upright side plate 244 on each side portion 240 protruding upwardly and outwardly from the opening in the arcuate channel 232 for overlapping respective laterally opposing sides of the outer end of the inner arm 66. Elongated fastener slots 245 are located in the two upright side plates 244 which receive fasteners therethrough which are secured into the outer end of the inner arm portion 66. Varying the positions of the fasteners within the slots 245 in the side plates 244 corresponds to the different mounting configurations of the first adjustable connection between the inner arm portion 66 and the outer arm portion 68. The fastener slots include a combination of upright and forwardly oriented slots so that repositioning of fasteners within the slots between the different mounting configurations of this first adjustable connection 200 corresponds approximately to a pivotal type connection between the outer arm portion and the inner arm portion resulting in the outer end of the swivel frame where the upright steering axis is located being displaced upwardly and downwardly while being varied in angular orientation as the first adjustable connection is adjusted between different mounting height configurations. Securing the fasteners at a selected position within the slots effectively fixes the outer arm portion immovably relative to the inner arm portion at the selected position.

With further reference to the embodiment of FIGS. 29 through 32, the first intermediate link 70 in this instance comprises two spaced apart plates at laterally opposing sides of the inner arm portion of the swing arm, in which the plates of the first link 70 each have a generally C shaped profile similarly to the previous embodiment. The first link 70 thus has a first or bottom end pivotally mounted on the mounting frame at a location spaced downward and forward of the swing axis and a top or a second end pivotally coupled to the top end of the second link 72 at a link axis that is upward and forward of the remaining axes in the deployed position.

The second intermediate link 72 in this instance is a first or bottom end in the deployed position that is pivotally supported on a pivot shaft mounted between laterally opposing boundary walls of the passage 230 in the inner arm portion 66 while the opposing second or top end of the intermediate link 72 in the deployed position protrudes above the inner arm portion for pivotal connection to the first link 70 at the link axis.

The first link in this instance further includes a handle member 82 extending upward near vertical in the deployed position beyond the link axis to be grasped by a user for pulling rearward to release the linkage from the deployed position. When pulling the handle member 82 rearward, the pivotal connection between the first and second intermediate links 70 and 72 is urged rearward and downward behind the swing axis towards the stored position. Meanwhile, the opposing bottom or second end of the second link 72 that is pivoted on the swing arm follows the movement of the link axis about the swing axis to be displaced initially upward and then rearward about the swing axis so that the swing arm is displaced from the deployed position to the stored position. Again, the pivotal connection of the second link 72 to the swing arm 53 must pass through a plane containing the link axis and the axis of the first link on the mounting frame so that the locking linkage must be displaced over-centre to initially release the linkage from the deployed position against the direction of weight acting on the auxiliary wheel 54.

Similar to previous embodiments, in order to adjust the auxiliary wheel into a desired height and orientation relative to the wheeled apparatus 12 when in the deployed position (subsequent to mounting of the mounting frame 58 of the mounting arrangement onto the wheeled apparatus 12 and displacement into the deployed position), the user initially uses the first adjustable connection to primarily adjust the height of the auxiliary wheel relative to the mounting frame on the wheeled apparatus 12. A height is selected to achieve a desirable amount of ground clearance of the front wheels of the wheeled apparatus being supported spaced above the ground in the deployed position of the auxiliary wheel assembly. Once the height has been selected, the first adjustable connection is fixed at the selected mounting configuration. The user then relies upon the second adjustable connection to adjust the angular orientation of the upright steering axis of the swivel 94 to assume a substantially vertical orientation while minimal corresponding change in the height of the wheel 54 relative to the mounting frame on the wheeled apparatus occurs. Once the upright steering axis is substantially vertical (or at any other desired angle such as a sloped steering axis according to FIG. 8), the second adjustable connection is fixed at the selected mounting configuration.

In further embodiments, the linkage arrangement may comprise (i) a track supported on the wheeled apparatus 12 by the mounting arrangement and (ii) a carriage frame slidable along the track and supporting the auxiliary wheel thereon to displace the auxiliary wheel between the deployed position and the stored position.

In further embodiments, the auxiliary wheel may be replaced with a pair of laterally spaced apart wheels movable by a common linkage of the linkage arrangement. Alternatively, the linkage arrangement may comprise two separate linkages at laterally opposing sides of the frame 14, each linkage supporting a respective auxiliary wheel thereon so as to define a pair of laterally spaced apart support wheels movable between the stored and deployed positions.

In further embodiments, the auxiliary wheel may be replaced by a ski supported for forward sliding movement along the ground.

In further embodiments, any of the arrangements to support the wheel in fixed or steerable orientations as described above can be used with any of the linkage arrangements described above that may or may not be adjustable in length and may or may not be biased into the deployed position, which in turn may be used with any of the locking linkages to secure the linkage arrangement in the deployed position.

In further embodiments, the movement of the auxiliary wheel 54 between the deployed position and the stored position can be accomplished by a linkage incorporating motors to drive the movement while still maintaining similar ranges of overall movement of the auxiliary wheel relative to the wheeled apparatus as described above.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. An auxiliary support assembly for a wheeled apparatus arranged for rolling movement on a supporting surface, the apparatus including a support frame for supporting a person including a footrest frame portion arranged to support feet of the person, two rear wheels supported on the support frame in proximity to a rear end of the support frame, and two front wheels supported on the support frame in proximity to a front end of the support frame, the auxiliary support assembly comprising:
  a mounting arrangement arranged to be supported on the support frame in which the mounting arrangement includes a mounting frame arranged to be mounted at a fixed location in relation to the support frame of the wheeled apparatus;
  an auxiliary support arranged for movement along said supporting surface; and
  a linkage arrangement connected to the mounting arrangement so as to be movable relative to the support frame, the linkage arrangement supporting the auxiliary support to be movable with the linkage arrangement relative to the support frame between a deployed position and a second position;
  wherein in the deployed position, the auxiliary support is arranged to be supported forwardly of the two front wheels at a lower elevation than the two front wheels such that the apparatus is carried on the supporting surface by the rear wheels and the auxiliary support and such that the front wheels are spaced above the supporting surface;
  wherein in the second position, the auxiliary support is retracted rearwardly relative to the deployed position such that the apparatus is carried on the supporting surface by the front wheels and the rear wheels;
  wherein the linkage arrangement comprises a swing arm pivotally mounted by a pivotal connection on the mounting frame of the mounting arrangement such that the swing arm is movable between the deployed position and the second position by pivoting about a swing arm axis of the pivotal connection relative to the mounting frame;
  wherein the mounting arrangement is arranged to locate the swing arm axis in proximity to the footrest frame portion; and
  wherein the auxiliary support is mounted on the swing arm so as to follow an arc about the swing arm axis from the deployed position spaced forwardly of the swing arm axis to the second position spaced rearwardly of the swing arm axis.

2. The assembly according to claim 1 wherein the linkage arrangement is arranged such that a protruding distance that the auxiliary support assembly protrudes forwardly from the support frame is reduced by at least 30 percent in the second position relative to the deployed position.

3. The assembly according to claim 1 wherein the mounting arrangement defines a pivotal connection at a fixed location on the support frame about which the auxiliary support pivots with the linkage arrangement relative to the support frame.

4. The assembly according to claim 1 wherein the linkage arrangement includes a resilient member biasing the linkage arrangement towards the deployed position when the auxiliary support is in proximity to the deployed position.

5. The assembly according to claim 1 wherein the swing arm is pivotal through a range of at least 50 degrees between the deployed position and the second position.

6. The assembly according to claim 1 wherein the linkage arrangement includes (i) a plurality of links coupled between the swing arm and the mounting frame and (ii) a handle member extending from a first intermediate link among the plurality of links, the handle member being pivotal with the first intermediate link relative to the mounting frame and being movable forwardly relative to the mounting frame as the auxiliary support is displaced from the second position to the deployed position.

7. The assembly according to claim 1 wherein the linkage arrangement includes a plurality of links arranged to be coupled between the swing arm and the support frame, the linkage arrangement being coupled to the support frame independently of said pivotal connection that connects the swing arm to the chair frame.

8. The assembly according to claim 1 wherein the auxiliary support pivots with the swing arm such that the auxiliary support follows said arc about the swing arm axis so as to be displaced downwardly and rearwardly, then upwardly and rearwardly after passing under the swing arm axis, from the deployed position forwardly of the swing arm axis to the second position rearwardly of the swing arm axis.

9. The assembly according to claim 8 wherein the linkage arrangement is arranged to engage a stop on the chair frame in the deployed position so as to prevent upward displacement of the auxiliary support away from the second position beyond the deployed position.

10. The assembly according to claim 1 wherein the swing arm is adjustable in length between said swing axis of the pivotal connection of the mounting arrangement and the auxiliary support on the swing arm.

11. The assembly according to claim 1 wherein the linkage arrangement comprises a locking linkage arranged to retain the swing arm in the deployed position in an engaged position of the locking linkage, the locking linkage being automatically engaged into the engaged position in response to the swing arm being displaced into the deployed position.

12. The assembly according to claim 11 wherein the locking linkage is biased into the engaged position by a spring.

13. The assembly according to claim 11 wherein the swing arm is biased into the deployed position from an intermediate position between the deployed position and the second position.

14. The assembly according to claim 13 wherein the swing arm is biased into the deployed position by gravity.

15. The assembly according to claim 13 wherein the swing arm is biased into the deployed position by a spring.

16. The assembly according to claim 15 wherein a common spring member applies a biasing force that simultaneously biases the swing arm into the deployed position and biases the locking linkage into the engaged position.

17. The assembly according to claim 1 further comprising:
a swivel supporting the auxiliary support on the linkage arrangement for pivotal movement about an upright steering axis;
the linkage arrangement including an inner arm portion coupled to the mounting arrangement and an outer arm portion coupling the swivel to the inner arm portion;
a first adjustable connection between (i) the outer arm portion and (ii) a first one of the inner arm portion and the swivel;
a second adjustable connection between (i) the outer arm portion and (ii) a second one of the inner arm portion and the swivel;
the first adjustable connection being adjustable between a plurality of different mounting configurations corresponding to different angular orientations of the upright steering axis relative to the mounting arrangement in the deployed position of the linkage arrangement;
the second adjustable connection being adjustable between a plurality of different mounting configurations corresponding to different angular orientations of the upright steering axis relative to the mounting arrangement in the deployed position of the linkage arrangement; and
a first one of the first adjustable connection and the second adjustable connection comprising a primary adjustable connection and a second one of the first adjustable connection and the second adjustable connection comprising a secondary adjustable connection;
each different mounting configuration of the primary adjustable connection further corresponding to a different elevation of the auxiliary support relative to the mounting arrangement in the deployed position of the linkage arrangement whereby the elevation of the auxiliary support relative to the mounting arrangement in the deployed position of the linkage arrangement is adjusted primarily through the primary adjustable connection.

18. The assembly according to claim 17 wherein in the deployed position of the linkage arrangement, the elevation of the auxiliary support varies with adjustment of the angular orientation of the upright steering axis relative to the mounting arrangement between the different mounting configurations of the primary adjustable connection by a greater amount than the elevation of the auxiliary support varies with adjustment of the angular orientation of the upright steering axis relative to the mounting arrangement between the different mounting configurations of the secondary adjustable connection.

19. The assembly according to claim 1 wherein the swing arm is biased automatically towards the deployed position responsive to lifting of the front end of the support frame.

20. An auxiliary support assembly for a wheeled apparatus arranged for rolling movement on a supporting surface, the apparatus including a support frame for supporting a person, two rear wheels supported on the support frame in proximity to a rear end of the support frame, and two front wheels supported on the support frame in proximity to a front end of the support frame, the auxiliary support assembly comprising:
a mounting arrangement arranged to be supported on the support frame in which the mounting arrangement includes a mounting frame arranged to be mounted at a fixed location in relation to the support frame of the wheeled apparatus;
an auxiliary support arranged for movement along said supporting surface; and
a linkage arrangement connected to the mounting arrangement so as to be movable relative to the support frame, the linkage arrangement supporting the auxiliary support to be movable with the linkage arrangement relative to the support frame between a deployed position and a second position;
wherein in the deployed position, the auxiliary support is arranged to be supported forwardly of the two front wheels at a lower elevation than the two front wheels such that the apparatus is carried on the supporting surface by the rear wheels and the auxiliary support and such that the front wheels are spaced above the supporting surface;
wherein in the second position, the auxiliary support is retracted rearwardly relative to the deployed position such that the apparatus is carried on the supporting surface by the front wheels and the rear wheels;

wherein the linkage arrangement is a four bar linkage defined by (i) the mounting frame, (ii) a swing arm supporting the auxiliary support thereon, (iii) a first intermediate link, and (iv) a second intermediate link;

wherein the swing arm is pivotally mounted by a pivotal connection on the mounting frame of the mounting arrangement such that the auxiliary support is movable between the deployed position and the second position by pivoting about a swing axis of the swing arm relative to the mounting frame;

wherein the first intermediate link is pivotally mounted on the mounting frame at a first axis at a location spaced from the swing axis of the swing arm;

wherein the second intermediate link is pivotally mounted on the first intermediate link for relative pivotal movement about a second axis and is pivotally mounted on the swing arm for relative pivotal movement about a third axis;

wherein the third axis traverses through a plane that locates the first axis and the second axis therein as the auxiliary support is displaced from the second position to the deployed position; and wherein the first intermediate link, the second intermediate link, and a linkage portion of the swing arm are each laterally offset from one another in a direction of the axes.

21. An auxiliary support assembly for a wheeled apparatus arranged for rolling movement on a supporting surface, the apparatus including a support frame for supporting a person, two rear wheels supported on the support frame in proximity to a rear end of the support frame, and two front wheels supported on the support frame in proximity to a front end of the support frame, the auxiliary support assembly comprising:

a mounting arrangement arranged to be supported on the support frame in which the mounting arrangement includes a mounting frame arranged to be mounted at a fixed location in relation to the support frame of the wheeled apparatus;

an auxiliary support arranged for movement along said supporting surface;

a linkage arrangement connected to the mounting arrangement so as to be movable relative to the support frame, the linkage arrangement supporting the auxiliary support to be movable with the linkage arrangement relative to the support frame between a deployed position and a second position; and a release lever arranged to actuate release of the linkage arrangement from the deployed position to the second position;

wherein in the deployed position, the auxiliary support is arranged to be supported forwardly of the two front wheels at a lower elevation than the two front wheels such that the apparatus is carried on the supporting surface by the rear wheels and the auxiliary support and such that the front wheels are spaced above the supporting surface;

wherein in the second position, the auxiliary support is retracted rearwardly relative to the deployed position such that the apparatus is carried on the supporting surface by the front wheels and the rear wheels;

wherein the linkage arrangement is a four bar linkage defined by (i) the mounting frame, (ii) a swing arm, (iii) a first intermediate link, and (iv) a second intermediate link;

wherein the swing arm is pivotally mounted by a pivotal connection on the mounting frame of the mounting arrangement such that the auxiliary support is movable between the deployed position and the second position by pivoting about a swing axis of the swing arm relative to the mounting frame;

wherein the first intermediate link is pivotally mounted on the mounting frame at a first axis at a location spaced from the swing axis of the swing arm;

wherein the second intermediate link is pivotally mounted on the first intermediate link for relative pivotal movement about a second axis and is pivotally mounted on the swing arm for relative pivotal movement about a third axis;

wherein in the deployed position, the linage arrangement must be through an over-center position against a direction of weight on the support frame of the wheeled apparatus acting on the auxiliary support; and wherein the release lever is pivotally mounted on the linkage arrangement and wherein the release lever includes (i) an actuating arm portion arranged to receive an actuation force from the person of the wheeled apparatus to pivot the release lever (ii) an engaging portion pivotal with the actuating arm portion;

wherein the release lever is pivotal from an out-of-use position in which the engaging portion is spaced from a contacting portion of the linkage arrangement to an engaged position in which the engaging portion engages in interference with the contacting portion of the linkage arrangement such that continued rotation of the engaging portion applies a releasing force acting on said contacting portion of the linkage to urge the linkage arrangement in a release direction from the deployed position through the over-center position.

* * * * *